United States Patent
Kourogi et al.

(10) Patent No.: US 7,239,442 B2
(45) Date of Patent: Jul. 3, 2007

(54) OPTICAL FREQUENCY COMB GENERATOR

(75) Inventors: Motonobu Kourogi, 4-28-905, Wakabadai, Asahi-ku, Yokohama-shi, Kanagawa, 241-0801 (JP); Widiyatmoko Bambang, Kanagawa (JP); Osamu Nakamoto, Tokyo (JP); Shigeyoshi Misawa, Tokyo (JP); Yoshinobu Nakayama, Tokyo (JP)

(73) Assignees: Japan Science and Technology Agency (JP); Motonobu Kourogi (JP)

( * ) Notice: Subject to any disclaimer, the term of this patent is extended or adjusted under 35 U.S.C. 154(b) by 117 days.

(21) Appl. No.: 10/484,598

(22) PCT Filed: Jul. 26, 2002

(86) PCT No.: PCT/JP02/07637
§ 371 (c)(1),
(2), (4) Date: Aug. 30, 2004

(87) PCT Pub. No.: WO03/010596
PCT Pub. Date: Feb. 6, 2003

(65) Prior Publication Data
US 2005/0018276 A1    Jan. 27, 2005

(30) Foreign Application Priority Data

| Jul. 26, 2001 | (JP) | ............................. 2001-226588 |
| Jul. 26, 2001 | (JP) | ............................. 2001-226591 |
| Oct. 31, 2001 | (JP) | ............................. 2001-334299 |
| Nov. 20, 2001 | (JP) | ............................. 2001-354947 |
| Feb. 15, 2002 | (JP) | ............................. 2002-038839 |
| Mar. 29, 2002 | (JP) | ............................. 2002-097167 |

(51) Int. Cl.
*H04B 10/17* (2006.01)
(52) U.S. Cl. ...................... 359/346; 359/333
(58) Field of Classification Search ................. 359/333, 359/346
See application file for complete search history.

(56) References Cited

U.S. PATENT DOCUMENTS 3,676,796 A * 7/1972 Weber .......................... 372/19

(Continued)

FOREIGN PATENT DOCUMENTS

| JP | T94047 | 1/1996 |
| JP | 10-206919 | 8/1998 |
| JP | N99-0293 | 8/1998 |
| JP | 11-288009 | 10/1999 |

OTHER PUBLICATIONS

Saitoh et al. Modulation Characteristic of Waveguide-Type Optical Frequency Comb Generator. Journal of Lightwave Technology, vol. 16, No. 5, May 1998. 824-832.*

(Continued)

*Primary Examiner*—Jack Keith
*Assistant Examiner*—Ari M. Diacou
(74) *Attorney, Agent, or Firm*—Reed Smith, LLP

(57) ABSTRACT

An optical frequency comb generator includes an oscillator (117) for oscillating modulating signals of a preset frequency, and an optical resonator (110) formed by an incident side reflecting mirror (112) and an outgoing side reflecting mirror (113), arranged parallel to each other. The optical resonator causes resonation in light incident via the incident side reflecting mirror (112). The optical frequency comb generator also includes an optical phase modulation unit (111) arranged between the incident side reflecting mirror (112) and the outgoing side reflecting mirror (113) for phase modulating the light, resonated by the optical resonator (110), by the modulating signals supplied from the oscillator (117), and for generating a plurality of sidebands centered about the frequency of the incident light at a frequency interval of the modulating signal. The outgoing side reflecting mirror (113) sets the transmittance from one frequency to another responsive to the light intensity of the generated sidebands.

28 Claims, 27 Drawing Sheets

U.S. PATENT DOCUMENTS

| | | | | | |
|---|---|---|---|---|---|
| 4,989,201 | A | * | 1/1991 | Glance | 398/95 |
| 5,153,933 | A | * | 10/1992 | Smith et al. | 385/27 |
| 5,166,822 | A | * | 11/1992 | Priatko et al. | 359/287 |
| 5,265,112 | A | * | 11/1993 | Noll et al. | 372/32 |
| 5,663,822 | A | * | 9/1997 | Fee | 398/95 |
| 5,699,378 | A | * | 12/1997 | Lealman et al. | 372/102 |
| 6,163,553 | A | * | 12/2000 | Pfeiffer | 372/6 |
| 6,201,638 | B1 | * | 3/2001 | Hall et al. | 359/346 |
| 6,487,329 | B2 | * | 11/2002 | Foltzer | 385/15 |
| 6,591,026 | B2 | * | 7/2003 | Endo et al. | 385/15 |
| 6,724,788 | B1 | * | 4/2004 | Holzwarth et al. | 372/32 |
| 6,897,959 | B2 | * | 5/2005 | Haensch et al. | 356/432 |
| 2005/0254534 | A1 | * | 11/2005 | Loewen et al. | 372/32 |

OTHER PUBLICATIONS

Arthur Lowery. Performance Predictions and Topology Improvements for Optical Serrodyne Comb Generators. Journal of Lightwave Technology, vol. 23, No. 8, Aug. 2005. 2371-2379.*

In Kag Hwang, Seok Hyun Yun, Byoung Yoon Kim. All-fiber nonreciprocal filter with wavelength□□tunability. OFC '98 Technical Digest. 336-338.*

OptoComb technical datasheet/avertising brochure. Optical Frequency Comb Generator. BK-SM 625C / BK-SM 2500C. Optical Comb Institute, Inc. Tokyo Institute of Technology, Incubation Center R204, 2-12-1, O-okayama, Meguro-ku, Tokyo, 152-8550 Japan http://www.optocomb.com.*

OptoComb technical datasheet/avertising brochure. Waveguide Optical Frequency Comb Generator. WTAS-01. Optical Comb Institute, Inc. Tokyo Institute of Technology, Incubation Center R204, 2-12-1, O-okayama, Meguro-ku, Tokyo, 152-8550 Japan http://www.optocomb.com.*

M. Kourogi, T. Enami and M. Ohtsu. A Monolithic Optical Frequency Comb Generator. IEEE Photonics Technology Letters, vol. 6, No. 2, Feb. 1994. 214-217.*

M. Kourogi, T. Enami, and M. Ohtsu. A Coupled-Cavity Monolithic Optical Frequency Comb Generator. IEEE Photonics Technology Letters, vol. 8, No. 12, Dec. 1996. 1698-1700.*

T. Saitoh, M. Kourogi, and M. Ohtsu. A Waveguide-Type Optical-Frequency Comb Generator. IEEE Photonics Technology Letters, vol. 7. No. 2, Feb. 1995. 197-199.*

Jun Ye, Harald Schnatz, and Leo W. Hollberg. Optical Frequency Combs: From Frequency Metrology to Optical Phase Control. IEEE Journal of Selected Topics in Quantum Electronics, vol. 9, No. 4, Jul./Aug. 2003. 1041-1058.*

New Focus, Inc. Practical Uses and Applications of Electro-Optic Modulators. Application Note 2, Rev C, Copyright 2001. http://www.newfocus.com/Online_Catalog/Literature/apnote2.pdf. DLed: Jul. 5, 2006.*

K. Imai; M. Kourogi; M. Ohtsu;—30-THz Span Optical Frequency Comb Generation by Self-Phase Modulation in an Optical Fiber, IEEE Journal Of Quantum Electronics, vol. 34, No. 1, Jan. 1998, pp. 54-60.

M. Kourogi; T. Enami; M. Ohtsu;—A Coupled-Cavity Monolithic Optical Frequency Comb Generator, IEEE Photonics Technology Letters, vol. 8, No. 12, Dec. 1996, pp. 1698-1700.

Jun Ye; Long-Sheng Ma; Timothy Daly; John L. Hall;—Highly selective terahertz optical frequency comb generator, Optics Letters, vol. 22, No. 5, Mar. 1, 1997, pp. 301-303.

M. Kourogi; T. Enami; M. Ohtsu;—A Monolithic Optical Frequency Comb Generator, IEEE Photonics Technology Letters, vol. 6, No. 2, Feb. 1994.

International Preliminary Examination Report (Translation).

K. Imai, M. Kourogi, M. Ohtsu "30-THz Span Optical Frequency Comb Generation by Self-Phase Modulation in an Optical Fiber", IEEE Journal Of Quantum Electronics, vol. 34, No. 1, Jan. 1998, pp. 54-60.

M. Kourogi, T. Enami, M. Ohtsu "A Coupled-Cavity Monolithic Optical Frequency Comb Generator", IEEE Photonics Technology Letters, vol. 8, No. 12, Dec. 1996, pp. 1698-1700.

M. Kourogi, T. Enami, M. Ohtsu "A Monolithic Optical Frequency Comb Generator", IEEE Photonics Technology Letters, vol. 6, No. 2, Feb. 1994, pp. 214-217.

European Search Report.

* cited by examiner

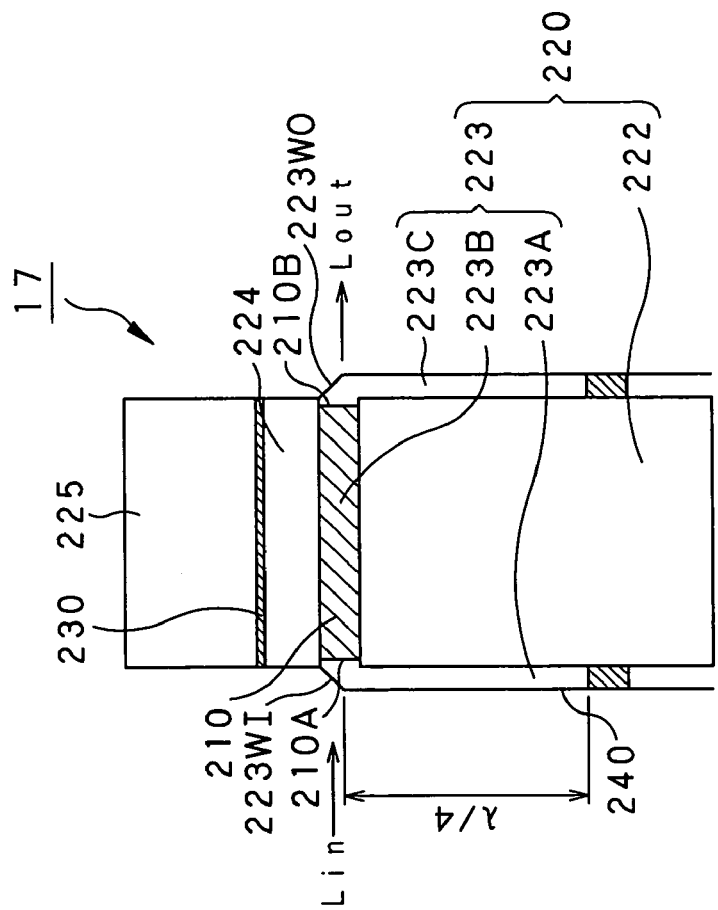
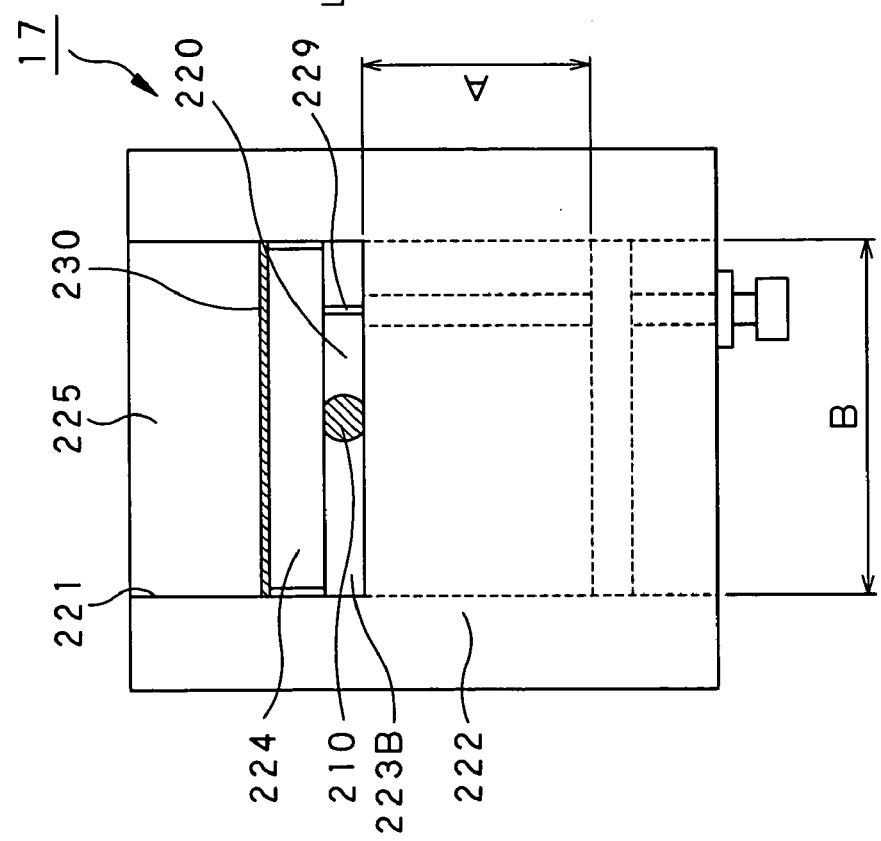
FIG.20B
FIG.20A

OPTICAL FREQUENCY COMB GENERATOR

TECHNICAL FIELD

This invention relates to an optical frequency comb generator that may be applied in a field which is in need of a standard light source of multi-wavelength highly coherent light, or a light source that is able to exploit the coherence between different wavelengths, such as in optical communication, optical CT or an optical frequency standard.

BACKGROUND ART

If, in heterodyne detection, the light frequency is to be measured to a high frequency, the light to be measured is caused to interfere with other light and an electrical signal of the optical beat frequency generated is detected. The bandwidth of laser light that may be measured in this heterodyne detection is limited to the band of the light receiving element used in the detection system, and is generally on the order of tens of GHz.

On the other hand, the bandwidth of light that may be measured needs to be increased further in order to measure the frequency of absorption lines, distributed over a wide range, or in order to control laser light for frequency division multiplex communication, in keeping up with the development in the domain of optoelectronics in recent years.

With a view to responding to the demand for enlarging the measurable bandwidth of light, a broadband heterodyne detection system, employing an optical frequency comb generator, was already devised. This optical frequency comb generator generates a number of comb-shaped sidebands, arranged at an equal interval on the frequency axis. The frequency stability of the sidebands is substantially equivalent to the frequency stability of the incident light. The generated sidebands and the light being measured are heterodyne-detected to construct a broadband heterodyne detection system extending over several THz.

FIG. 1 shows the topical structure of a conventional optical frequency comb generator 9.

This optical frequency comb generator 9 includes an optical resonator 90, made up of an optical phase modulator 91 and reflecting mirrors 92, 93 arranged facing each other with the optical phase modulator 91 in-between.

The optical resonator 90 causes light resonation of light Lin, incident via reflecting mirror 92 with a low transmittance, in a space between the reflecting mirrors 92, 93, while radiating a fraction Lout of the incident light via reflecting mirror 93. The optical phase modulator 91 is formed by an electro-optical crystal for optical phase modulation, which is changed in refractive index on application of an electrical field thereto. The light traversing this optical resonator 90 is phase-modulated responsive to an electrical signal of the modulation frequency fm, supplied to an electrode 96.

By introducing an electrical signal, synchronized with the time of a round trip of light through the optical resonator 90, from the electrode 96 to the optical phase modulator 91 for driving, it is possible with this optical frequency comb generator 9 to apply phase modulation deeper tens of times than in case of light traveling only once through the optical phase modulator 91. Thus, the optical frequency comb generator 9 is able to generate hundreds of higher order sidebands. The frequency interval fm between the neighboring sidebands is equivalent the modulating frequency fm of the input electrical signals.

Meanwhile, in determining the frequency of the light under measurement based on the large number of the optical frequency combs generated, the optical frequency comb generator 9 modulates the incident light with the frequency $v_1$, with the frequency fm, by the optical phase modulator 91, to generate optical frequency combs composed of the sidebands with the frequency interval fm. These optical frequency combs are superposed on the light under measurement, with the frequency $v_2$, and the beat frequency $\Delta v$ with respect to the Nth sideband generated as the optical frequency comb is measured to determine $|v_1-v_2|$. Ultimately, the frequency $v_2$ of the light under measurement is measured.

The light intensity distribution of the so generated sidebands is flattened out to render the sensitivity of the optical frequency combs constant for the entire frequency range, such that it becomes possible to measure the frequency of the light under measurement accurately such as to relieve the designing load in the downstream side circuitry used for detecting the generated sidebands.

However, in the conventional optical frequency comb generator 9, the light intensity of the sidebands is decreased with increase in the absolute value of $\Delta v$, in other words, with increase in the frequency deviation from the frequency of the incident light. In particular, the light intensity of the sidebands is exponentially decreased for a band which appreciably differs from the frequency of the incident light. The result is that the light intensity distribution of the sidebands is not uniform and susceptible to variations.

On the other hand, the optical frequency comb generator 9 has to use a reflecting mirror of high reflectance in order to suppress loss of light to be resonated. However, the reflecting mirror of high reflectance also reflects the light supplied from an external light source, thus increasing the light loss at the time of light incidence.

Thus, for accurately measuring the light under measurement, an optical frequency comb generator capable of suppressing the light loss to a minimum, as it is attempted to flatten out the light intensity distribution in the generated sidebands, needs to be realized.

DISCLOSURE OF THE INVENTION

In view of the above-depicted status of the art, it is an object of the present invention to provide an optical frequency comb generator whereby the frequency of the light under measurement may be measured to high accuracy even in a band having marked difference from the frequency of the incident light, by attempting to flatten out the light intensity distribution in the generated sidebands, and by diminishing the light loss at the time of light incidence.

The present invention provides an optical frequency comb generator comprising oscillation means for oscillating modulating signals of a preset frequency, resonation means formed by an incident side reflecting mirror and an outgoing side reflecting mirror, arranged parallel to each other, and adapted for causing resonation in light incident via the incident side reflecting mirror, and optical modulation means arranged between the incident side reflecting mirror and the outgoing side reflecting mirror for phase modulating the light resonated by the resonation means by the modulating signals supplied from the oscillation means, and for generating a plurality of sidebands centered about the frequency of the incident light at a frequency interval of the modulating signal. The transmittance for the outgoing side reflecting mirror is set from one frequency to another responsive to the light intensity of the generated sidebands.

The present invention provides an optical frequency comb generator comprising oscillation means for oscillating modulating signals of a preset frequency, resonation means formed by an incident side reflecting mirror and an outgoing side reflecting mirror, arranged parallel to each other, and adapted for causing resonation in light incident via the incident side reflecting mirror, and optical modulation means arranged between the incident side reflecting mirror and the outgoing side reflecting mirror for phase modulating the light resonated by the resonation means by the modulating signals supplied from the oscillation means, and for generating a plurality of sidebands centered about the frequency of the incident light at a frequency interval of the modulating signal. The incident side reflecting mirror has the maximum transmittance at the frequency of the incident light.

The present invention also provides an optical frequency comb generator comprising oscillation means for oscillating modulating signals of a preset frequency, resonation means formed by an incident side reflecting mirror and an outgoing side reflecting mirror, arranged parallel to each other, and adapted for causing resonation in light incident via the incident side reflecting mirror, and optical modulation means arranged between the incident side reflecting mirror and the outgoing side reflecting mirror for phase modulating the light resonated by the resonation means by the modulating signals supplied from the oscillation means, and for generating a plurality of sidebands centered about the frequency of the incident light at a frequency interval of the modulating signal. The incident side reflecting mirror has the maximum transmittance at the frequency of the incident light and the transmittance for the outgoing side reflecting mirror is set from one frequency to another responsive to the light intensity of the generated sidebands.

BRIEF DESCRIPTION OF THE DRAWINGS

FIGS. 20A and 20B show a structure of a U-shaped bulk type optical frequency comb generator.

FIGS. 26A and 26B show the relationship of the reflectance and the transmittance for each frequency on the light incident side reflecting film when the length of a gap between the incident side reflecting film and the fiber reflecting film is equal to a.

BEST MODE FOR CARRYING OUT THE INVENTION

Figure 1:
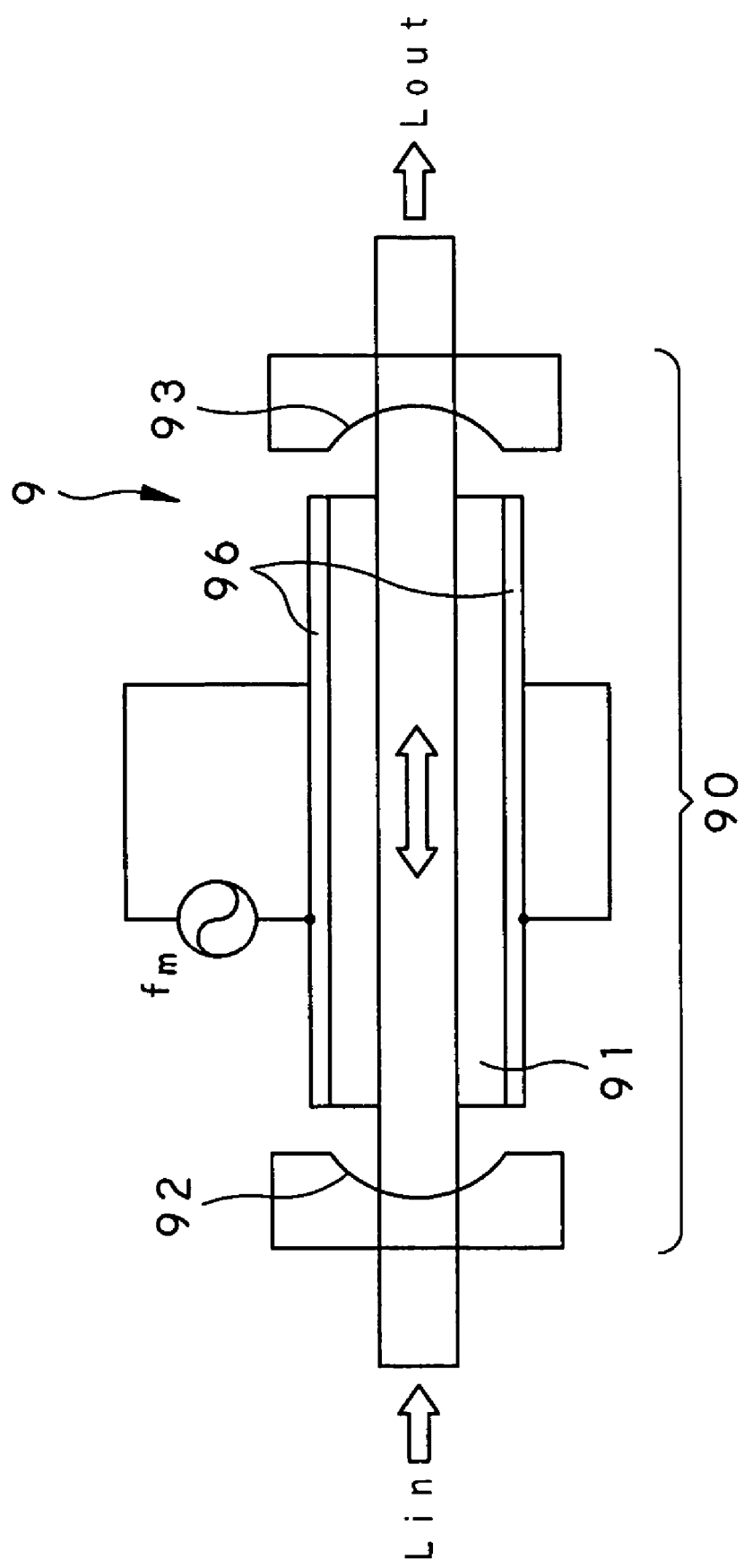
FIG. 1 illustrates a specified illustrative structure of a conventional optical frequency comb generator.
Figure 2:
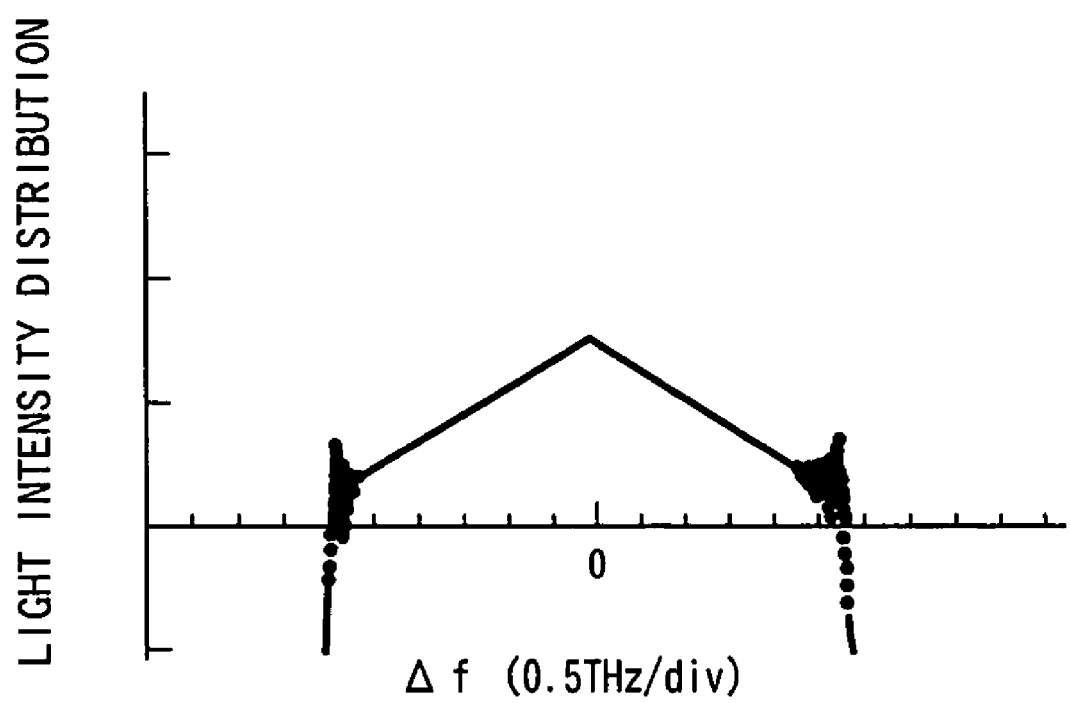
FIG. 2 shows the band-based light intensity distribution of the radiated light in the conventional optical frequency comb generator.

Referring to the drawings, preferred embodiments of the present invention are explained in detail.

Figure 3:
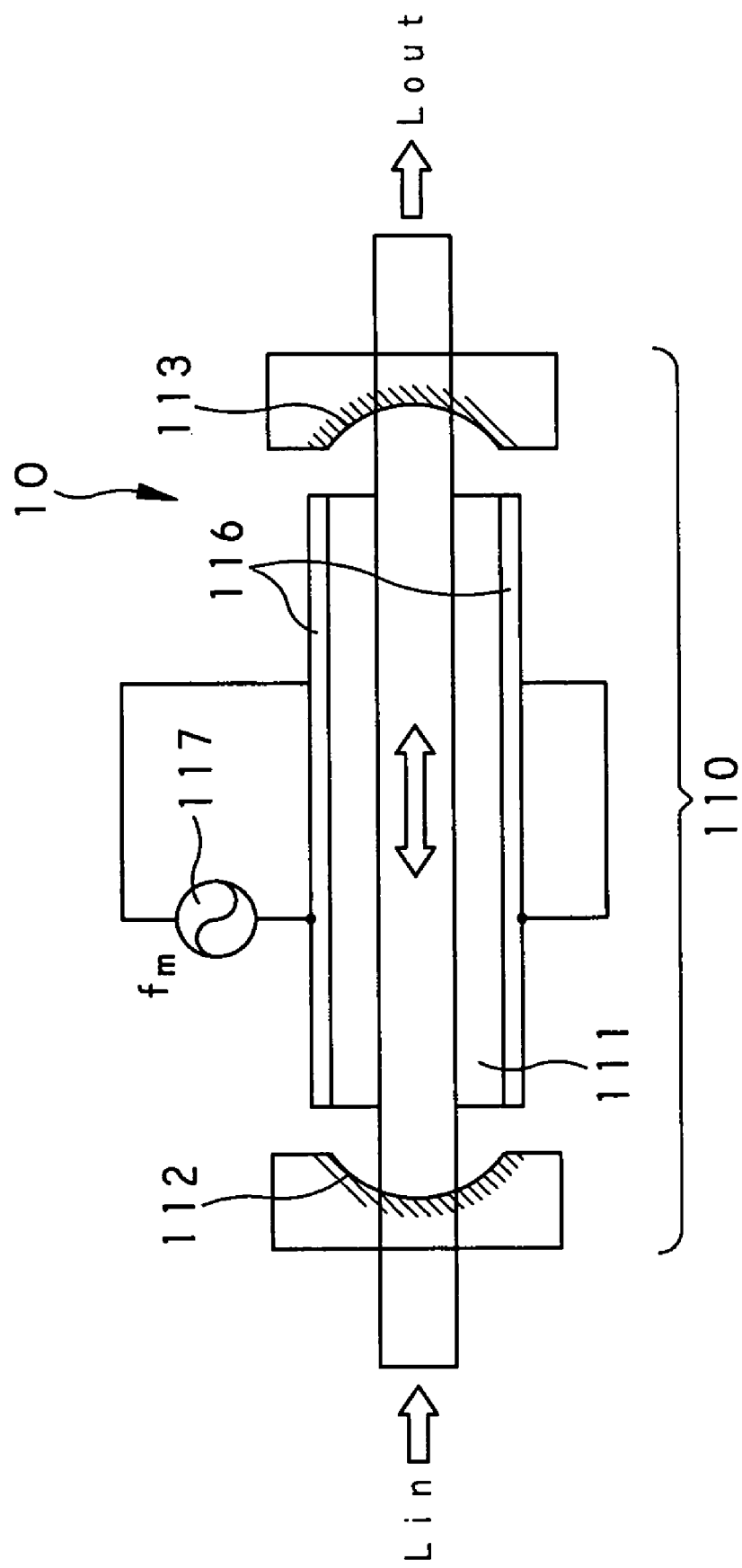
FIG. 3 shows a specified illustrative structure of a bulk type optical frequency comb generator.

FIG. 3 shows an instance of application of the optical frequency comb generator of the present invention to a bulk type optical frequency comb generator 10. This bulk type optical frequency comb generator 10 includes an optical phase modulator 111, an optical resonator 110, composed of an incident side reflecting mirror 112 and an outgoing side reflecting mirror 113, mounted facing each other with the optical phase modulator 111 in-between, an electrode 116 and an oscillator 117.

The optical resonator 110 causes light resonation of light Lin, incident via incident side reflecting mirror 112, in a space between the incident side reflecting mirror 112 and the outgoing side reflecting mirror 113, to radiate a portion Lout of the incident light through the outgoing side reflecting mirror 113.

The optical phase modulator 111 is an optical device, formed of a bulk crystal e.g. of lithium niobate ($LiNbO_3$), and phase-modulates the proceeding light based on supplied electrical signals. This optical phase modulator 111 modulates the proceeding light by exploiting the physical phenomenon, such as Pockels effect, in which the refractive index of light is changed in proportion to the electrical field, of Kerr effect, in which the refractive index of light is changed in proportion to the square of the strength of the electrical field.

The incident side reflecting mirror 112 and the outgoing side reflecting mirror 113 are provided for causing the resonation of the light incident on the optical resonator 110. That is, the incident side reflecting mirror 112 and the outgoing side reflecting mirror 113 cause the light traveling through the optical phase modulator 111 to be reflected back and forth to cause resonant oscillations. The incident side reflecting mirror 112 is mounted on the light incident side of the optical phase modulator 111. On this incident side reflecting mirror falls the light Lin of the frequency $v_1$ from a light source, not shown. The incident side reflecting mirror 112 reflects the light reflected back from the outgoing side reflecting mirror 113 and transmitted through the optical phase modulator 111. The outgoing side reflecting mirror 113 is mounted on the light outgoing side of the optical phase modulator 111 to reflect the light transmitted through the optical phase modulator 111. The outgoing side reflecting mirror 113 radiates a certain proportion of the light transmitted through the optical phase modulator 111 to outside.

It should be noted that the incident side reflecting mirror 112 and the outgoing side reflecting mirror 113 may be mounted as a multi-layer film end face mirror on a light incident side end face and a light radiating side end face of the optical phase modulator 111, in place of being provided outside of the optical phase modulator 111. The transmittance of the incident side reflecting mirror 112 and the outgoing side reflecting mirror 113 will be explained in detail subsequently.

A pair of electrodes 116 are mounted on the upper and bottom surfaces of the optical phase modulator 111 so that the direction of the modulating electrical field will be perpendicular to the direction of light propagation. The electrodes 116 introduce the electrical signals, supplied from an oscillator 117, to the optical phase modulator 111 for driving. The oscillator 117 is connected to the electrodes 116 for introducing electrical signals of a frequency fm, such as approximately 100 GHz.

In the above-described bulk type optical frequency comb generator 10, the electrical signals, synchronized with the time of reciprocation of light through the inside of the optical resonator 110, are introduced through the electrodes 116 to the optical phase modulator 111 for driving, whereby it is possible to apply phase modulation tens of times deeper than in case the light is caused to travel only once through the inside of the optical phase modulator 111. Thus, with the bulk type optical frequency comb generator 10, hundreds of sidebands, centered about the frequency of the incident light, may be generated over a wide frequency range. Meanwhile, the frequency spacing of the neighboring sidebands is unexceptionally equivalent to the frequency fm of the input electrical signals.

The transmittance of the incident side reflecting mirror 112, forming the optical resonator 110, is now explained.

Figure 4A:
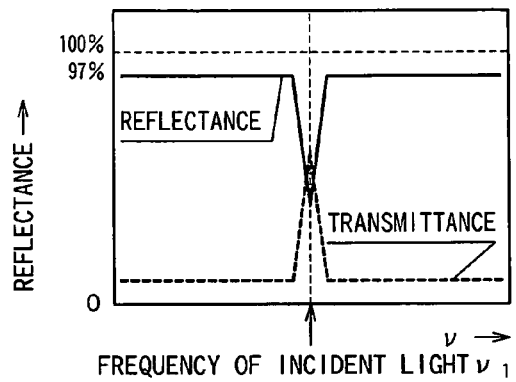
FIGS. 4A to 4C show the transmittance and the reflectance of an incident side reflecting mirror.

The transmittance of the incident side reflecting mirror 112 is set so as to be maximum at the frequency $v_1$ of the incident light, as shown in FIG. 4A. In this figure, the abscissa denotes the frequency v. The transmittance of the incident side reflecting mirror 112 is set so as to be lower in a band other than the frequency $v_1$ than that at frequency $v_1$. Although the distribution curve for the transmittance is locally maximum at $v_1$, the gradient of the curve may also be moderate, instead of being steep. That is, the incident light may travel through the incident side reflecting mirror 112 at a certain constant bandwidth. The reflectance at $v_1$ may not only limitlessly approach 0%, but may be approximately 100%.

Figure 4B:
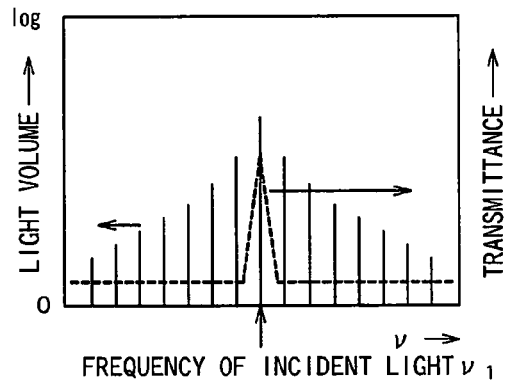

That is, by controlling the transmittance of the incident side reflecting mirror 112 as described above, the light of the frequency $v_1$, supplied from the light source, can readily be incident via the incident side reflecting mirror 112 to the optical phase modulator 111. Although a large number of sidebands are produced over a wide frequency range by introducing modulating signals to the light resonated within the optical phase modulator 111, the transmittance of the incident side reflecting mirror 112 is set to a lower value in a frequency band other than the frequency $v_1$. Thus, the majority of the sidebands of the optical frequency combs generated are not transmitted to outside through the incident side reflecting mirror 112 and are subjected to reciprocating reflection in the inside of the optical phase modulator 111, as shown in FIG. 4B.

Moreover, with the bulk type optical frequency comb generator 10 of the present invention, light losses during resonation may be gradually decreased by gradually narrowing the bandwidth of possible transmission (BW) of the incident light through the incident side reflecting mirror 112. Thus, the light volume of the respective sidebands is gradually increased as the bandwidth of possible transmission of the incident light becomes narrower, as shown in FIG. 4C.

Figure 4C:
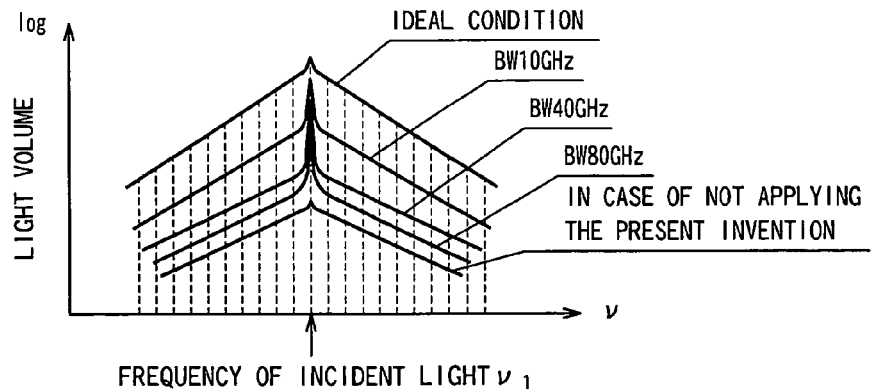

Additionally, with the present invention, the light losses at the time of resonation may be diminished even in case the bandwidth of possible transmission of the incident light is broad, being approximately eight times the frequency fm, as shown in FIG. 4C. That is, the present invention can be applied in case the reflectance is minimum at the frequency $v_1$, even though the incident side reflecting mirror 112 is able to transmit the frequency band other than the frequency $v_1$ of the incident light.

Moreover, with the bulk type optical frequency comb generator 10 embodying the present invention, the light loss at the time of resonation may be suppressed to the smallest value, as shown in FIG. 4C, in case the generator 10 is able to transmit only the frequency $v_1$ of the incident light, with the reflectance in the frequency range other than the frequency $v_1$ being 100% (ideal condition). Thus, the light volume of the sidebands may be increased.

That is, with the bulk type optical frequency comb generator 10, embodying the present invention, it is possible to prevent transmission to outside of the sidebands other than the frequency $v_1$ of the incident light. Thus, with the present invention, the light losses may be decreased to generate the optical frequency comb efficiently. Additionally, with the bulk type optical frequency comb generator 10, embodying the present invention, the transmittance is maximum at the frequency $v_1$ of the incident light, and hence the light loss at the time of incidence may be decreased, thus further improving the efficiency. Furthermore, with the bulk type optical frequency comb generator 10, the resonated light output may be increased even in case a light source of a small output is used.

The transmittance of the outgoing side reflecting mirror 113 of the optical resonator 110 is now explained.

The transmittance of the outgoing side reflecting mirror 113 is determined for each frequency, responsive to the light intensity of the generated sidebands. Stated differently, the transmittance of the outgoing side reflecting mirror 113 is set with an eye directed to physical properties of the sidebands the light intensity of which is increased or decreased with the frequency. Thus, it is necessary to consider the light intensity $P_{inside}$ of the sidebands within the optical resonator 110.

Figure 5:
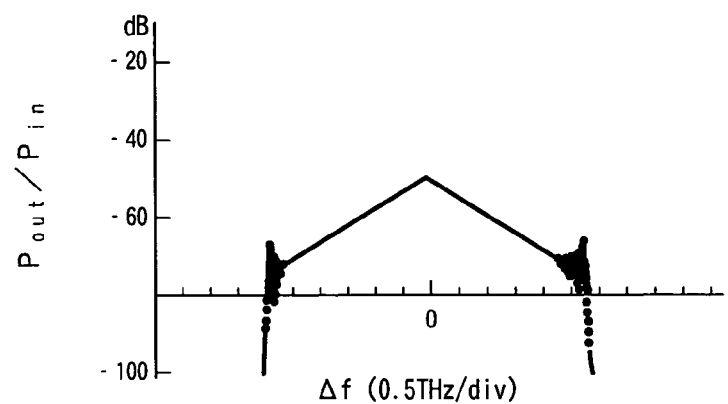
FIG. 5 shows the ratio of the light intensity of the outgoing light ($P_{out}$) and the light intensity of the incident light ($P_{in}$) in each band.

FIG. 5 shows the ratio of the light intensity $P_{out}$ of the light radiated from the outgoing side reflecting mirror 113 (referred to below as the outgoing light) to the light intensity $P_{in}$ of the light incident on the incident side reflecting mirror 112 (referred to below as the incident light). It is noted that $P_{out}$ has been calculated based on the detailed simulation including the characteristics of the material, and simulates the spectral distribution of the generated sideband by an envelop shown in FIG. 5. The tendency shown in FIG. 5 is assumed to be constant for the entire frequency range for the transmittance of the outgoing side reflecting mirror 113. The ordinate denotes the ratio of the light intensity of the radiated light to that of the incident light ($P_{out}/P_{in}$) while the abscissa denotes the difference $\Delta f$ between the frequency of each sideband generated and the frequency $v_1$ of the incident light.

Referring to FIG. 5, the light intensity $P_{out}$ of the outgoing light is maximum for $\Delta f=0$, in other words, for the frequency $v_1$ of the incident light, and is changed exponentially with the frequency difference $\Delta f$.

On the other hand, the light intensity $P_{out}$ of the outgoing light, radiated from the outgoing side reflecting mirror 113, may be approximated by the following equation (1), insofar as it is not affected by the group refractive index variance:

$$P_{out}=T_{in}T_{out}\exp\{-|\Delta f|Los/(\beta fm)\}P_{in} \quad (1).$$

where $T_{in}$ is the transmittance of the outgoing side reflecting mirror 113, Tout is the transmittance of the incident side reflecting mirror 112, $\beta$ is the modulation factor during reciprocation of light within the optical resonator 110, and Los is the loss rate of light during its reciprocation within the optical resonator 110, these being all represented by constants. If the loss factor of light in the optical resonator 110 is only transmission to outside through the incident side reflecting mirror 112 and the outgoing side reflecting mirror 113, Los is the sum of $T_{in}$ and $T_{out}$.

The following equations (2.1), (2.2):

$$dP_{inside}/d\Delta f=-Los/(\beta fm)P_{inside}, \text{ for } \Delta f>0 \quad (2.1)$$

$$dP_{inside}/d\Delta f=Los/(\beta fm)P_{inside}, \text{ for } \Delta f<0 \quad (2.2).$$

represent rates of change of light intensity $P_{inside}$ of the sidebands of the optical resonator 110 with respect to $\Delta f$, as estimated from the equation (1).

That is, these equations (2.1), (2.2) may be represented by differential equations with respect to $\Delta f$, such that the rate of change of the light intensity $P_{inside}$ of the sideband may be found as a function of $\Delta f$.

This equation (2.1) shows the rate of change of the light intensity for $\Delta f>0$, that is, for the frequency band higher than the frequency of the incident light, while the equation (2.2) shows the rate of change of the light intensity for $\Delta f<0$, that is, for the frequency band lower than the frequency of the incident light. For $\Delta f=0$, that is for the frequency band equal to the frequency of the incident light, the light intensity of the sideband may be represented by the intensity of the light transmitted through the incident side reflecting mirror 112, such that the light intensity of the sideband may be represented by the product of the light intensity $P_{in}$ of the incident light and the transmittance $T_{in}$ of the incident side reflecting mirror 112, as shown by the following equation (2.3):

$$P_{inside}=T_{in}\times P_{in} \quad (2.3).$$

From $P_{inside}$, calculated from these equations (2.1) to (2.3), the light intensity $P_{out}$ of the radiated light may be calculated, based on the equation (2.4):

$$P_{out}=T_{out}\times P_{inside} \quad (2.4).$$

The equation (1) may also be derived by putting the equations (2.1) to (2.4) into order, with Tout and Tin as constants.

According to the present invention, the light intensity $P_{inside}$ of the sidebands in the resonator 110, that may be represented by the above equation, may be flattened from one spectral component to another and radiated to outside. Stated differently, the transmittance $T_{out}$ is set from one frequency band to another in the outgoing side reflecting mirror 113 to control the intensity of light radiated to outside.

The condition for the transmittance $T_{out}$ of the outgoing side reflecting mirror 113 may be represented by the following equations (3.1), (3.2):

$$dT_{out}/d\Delta f=Los/(\beta fm)T_{out} \quad (3.1)$$

$$dT_{out}/d\Delta f=-Los/(\beta fm)T_{out} \quad (3.2)$$

by assuming that $dP_{out}/d\Delta f=0$ and substitution into the equations (2.1) to (2.4)

The transmittance $T_{out}$ of the outgoing side reflecting mirror 113 is determined based on these equations (3.1), (3.2). Meanwhile, plural solutions may be obtained in calculating the equations (3.1), (3.2), depending on the manner of setting the transmittance for $\Delta f=0$ (this transmittance is referred to below as an initial value).

Figure 6:
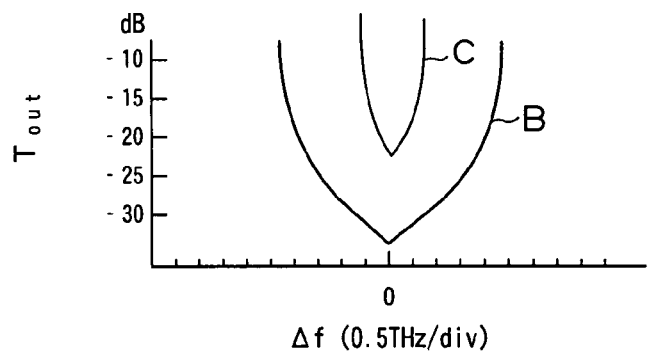
FIG. 6 shows setting examples of the transmittance of the outgoing side reflecting mirror.

FIG. 6 shows the results as found of the transmittance $T_{out}$ of the outgoing side reflecting mirror 113 based on the equations (3.1), (3.2). Los is the total loss during the round trip of light within the resonator 110. It is assumed that $Los=T_{in}+T_{out}$ with $T_{in}=0.005$. In FIG. 6, the curves B and C are of different initial values.

Figure 7:
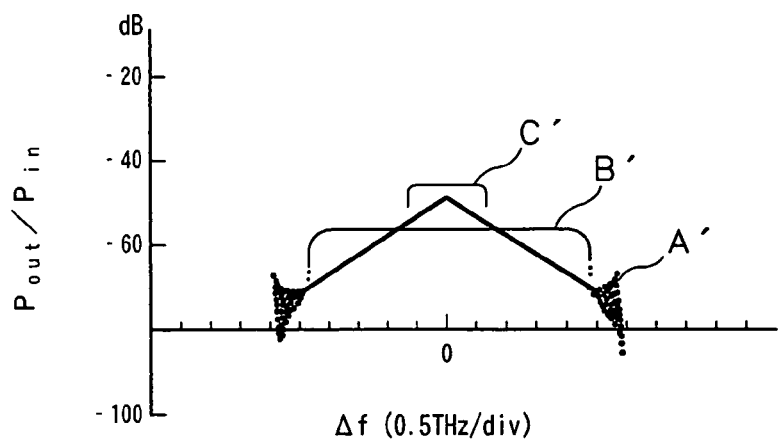
FIG. 7 shows the light intensity distribution for each frequency of the outgoing light relative to the incident light.

FIG. 7 shows the light intensity ratio in the respective bands of the outgoing light to the incident light. In this figure, a curve A' represents the light intensity distribution of FIG. 5 overlaid, while a curve B' shows the light intensity distribution of the outgoing light $P_{out}$ when an outgoing side reflecting mirror 115 is set to the transmittance $T_{out}$ as indicated by the curve B in FIG. 6, and a curve C' shows the light intensity distribution of the outgoing light $P_{out}$ when an outgoing side reflecting mirror 113 is set to the transmittance $T_{out}$ as indicated by the curve C in FIG. 6. Referring to FIG. 7, the curves B' and C' denote light intensity characteristics flattened out in the vicinity of the frequency of the incident light.

In FIG. 7, the light intensity of the curve B' is higher than that of the curve A' in a band excluding the vicinity of the frequency of the incident light, while the light intensity of the curve C' is higher than the curve A' in the total frequency range, such that the optical frequency combs can be generated to a higher efficiency. The reason is that the sideband generated within the optical resonator can be directly filtered and hence the optical loss can be reduced further.

Moreover, according to the present invention, the initial value is controlled to flatten out the light intensity characteristics over a wide frequency range as is the curve B', or the optical frequency comb with a higher optical intensity may be generated over a narrow band, as is the curve C'. Thus, an operator may control the initial value to optionally select which of the bandwidth and the optical intensity is to be preempted.

Moreover, according to the present invention, not only may the sidebands be flattened out over the entire frequency range, but also the light intensity distribution may be flattened out over a partial frequency range, by controlling the initial value. In this case, there are occasions where the transmittance $T_{out}$ is not smallest at $\Delta f=0$, but becomes a curve rising towards right, as shown in FIG. 6.

Figure 8:
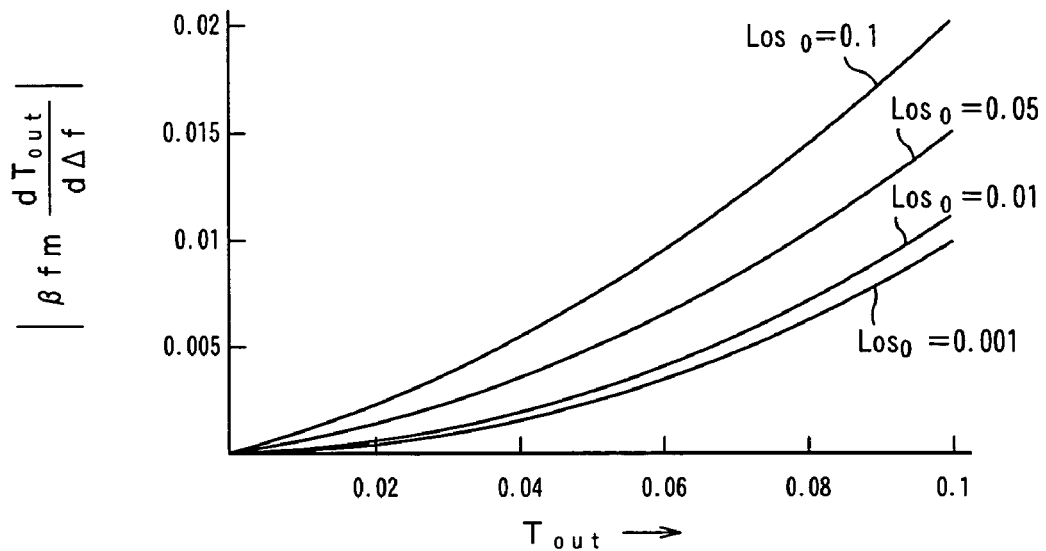
FIG. 8 shows the relationship between the transmittance of the outgoing side reflecting mirror and the standardized frequency difference of the transmittance.

The relationship between the transmittance $T_{out}$ and the absolute values of the differences of the standardized frequency of the transmittance is shown in FIG. 8. This figure shows the relationship between the optimum transmittance and the transmittance for the value of $Los_0 = Los - T_{out}$. In actually designing the optical frequency comb generator according to the present invention, a mirror partially having the characteristics shown in FIG. 8, is used, from among the mirrors having reflection characteristics possible from designing, as the mirror used as the outgoing side reflecting mirror 113.

Figure 9:
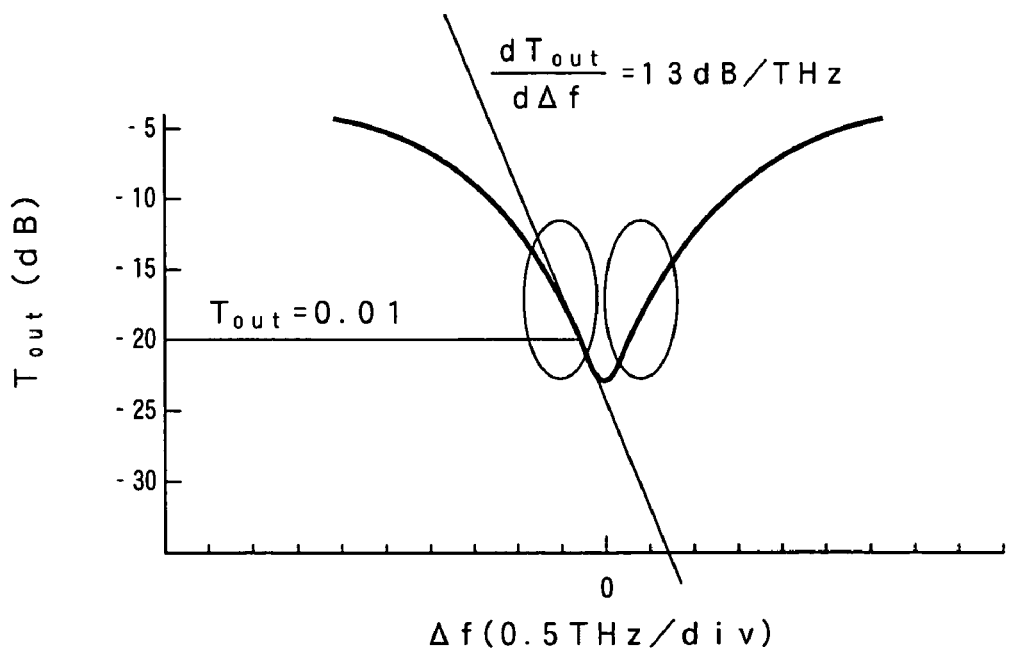
FIG. 9 shows transmittance characteristics of the outgoing side reflecting mirror with respect to the frequency difference Δf.
Figure 10:
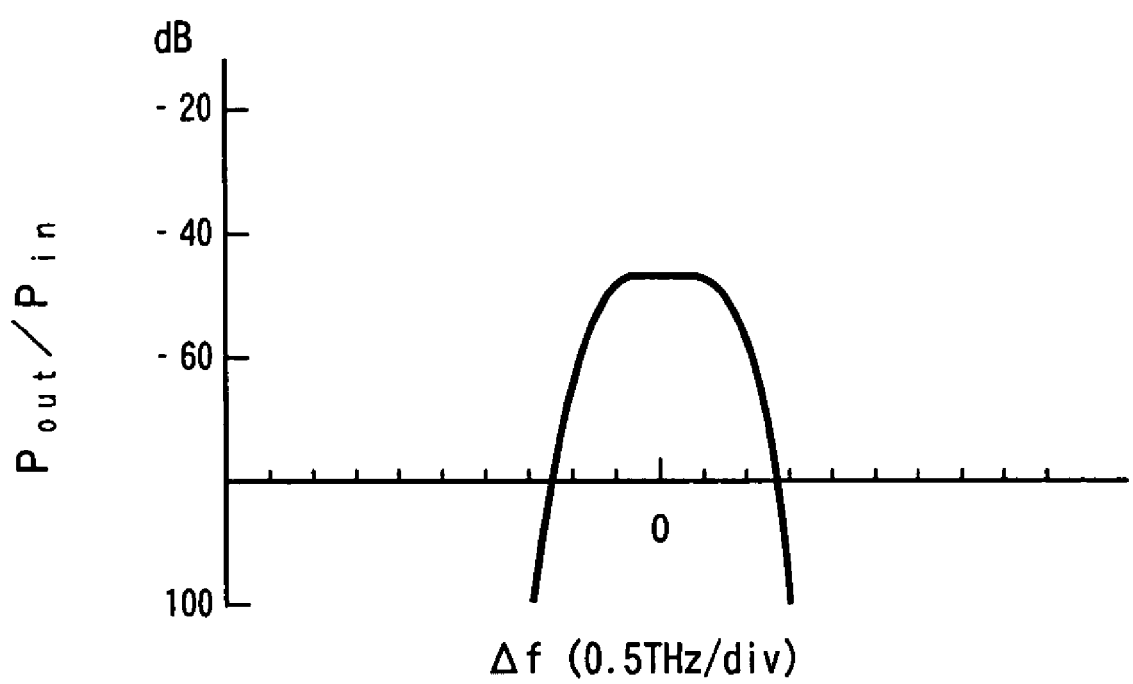
FIG. 10 shows the light intensity distribution of the outgoing light relative to the incident light in case of selecting the reflecting mirror having the characteristics of FIG. 9 as an outgoing side reflecting mirror.

FIG. 9 shows transmittance characteristics of the outgoing side reflecting mirror 113 having Lorenz type reflection characteristics and in which the gradient of the curve $dT_{out}/d\Delta f$ for $T_{out}=0.01$ is −13 dB/THz. According to the present invention, the optical frequency comb generated may be flattened out when a mirror showing the transmittance characteristics shown in FIG. 9 and satisfying the conditions shown in FIG. 8 is used as the outgoing side reflecting mirror 113. FIG. 10 shows the light intensity ratio in each band of the outgoing light to the incident light in case of flattening out of the generated optical frequency combs.

That is, with the bulk type optical frequency comb generator 10 of the present invention, in which transmittance characteristics of the outgoing side reflecting mirror 113 are controlled as described above to flatten out the generated sidebands as the light intensity of the outgoing light is prevented from being lowered.

On the other hand, with the bulk type optical frequency comb generator 10 of the present invention, transmission of the sideband in a range outside the frequency $v_1$ of the incident light may be prohibited by setting the transmittance characteristics of the incident side reflecting mirror 112 as described above. In addition, the optical loss at the time of light incidence may be reduced further. If the transmittance characteristics shown in FIG. 4 are substituted for the light intensity $P_{in}$ of the incident light shown by the equation (2.1) and the transmittance $T_{in}$ of the incident side reflecting mirror 112 to find $P_{out}$ the light intensity of the outgoing light may be improved under ideal conditions by approximately 20 dB with respect to the incident light shown in FIG. 7. That is, according to the present invention, the light intensity of the outgoing light maybe synergistically improved by providing both the incident side reflecting mirror 112 outgoing side reflecting mirror 113.

That is, with the bulk type optical frequency comb generator 10 according to the present invention, in which it is possible to flatten out the light intensity distribution in the generated sidebands, the sensitivity of the optical frequency combs can be rendered constant over the entire frequency range. Moreover, with the optical frequency comb generator 10 according to the present invention, in which the optical loss may be reduced further, the frequency of the light under measurement may be measured to high accuracy even in a frequency band having marked frequency difference from the frequency of the incident light. In this bulk type optical frequency comb generator 10, a large number of sidebands having a high light intensity which is uniform over the frequency bands may be generated, so that, by applying it to an optical transmission apparatus in the wavelength division multiplexing (WDM) or dense wavelength division multiplexing (DWDM), it is possible to generate a large number of light beams having different wavelengths and to apply the modulation with the so generated light beams as the carrier wave to generate modulated optical signals to multiplex and transmit the so generated signals.

Meanwhile, the present invention is not limited to such a case wherein the aforementioned transmittance is set to each of the incident side reflecting mirror 112 and the outgoing side reflecting mirror 113. For example, the aforementioned transmittance characteristics may be set to only the incident side reflecting mirror 112 or to only the outgoing side reflecting mirror 113.

Figure 11:
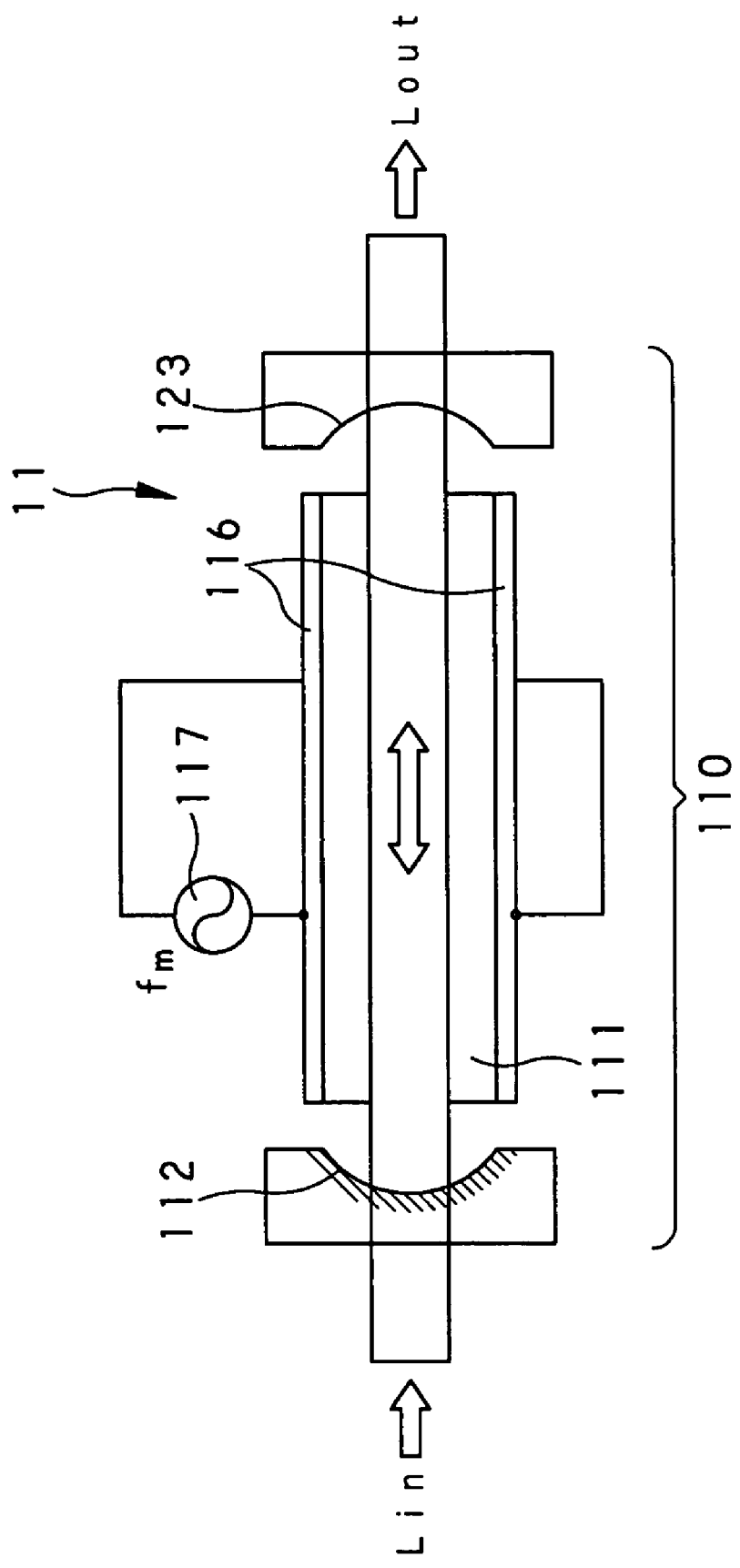
FIG. 11 shows a bulk type optical frequency comb generator in which a preset transmittance is set only for the incident side reflecting mirror.

FIG. 11 shows a bulk type optical frequency comb generator 11 in which the aforementioned transmittance is set for only the incident side reflecting mirror. The parts or components which are the same as those of the bulk type optical frequency comb generator 10 are denoted by the same reference numerals and are not explained specifically.

This bulk type optical frequency comb generator 11 includes an optical phase modulator 111, an optical resonator 110, composed of an incident side reflecting mirror 112 and an outgoing side reflecting mirror 113, mounted facing each other with the optical phase modulator 111 in-between, a pair of electrodes 116, and an oscillator 117.

The optical resonator 110 causes light resonation of light Lin, incident via incident side reflecting mirror 112 with a low transmittance, in a space between the incident side reflecting mirror 112 and the outgoing side reflecting mirror 123, to radiate a portion Lout of the incident light through the outgoing side reflecting mirror 123.

Figure 12:
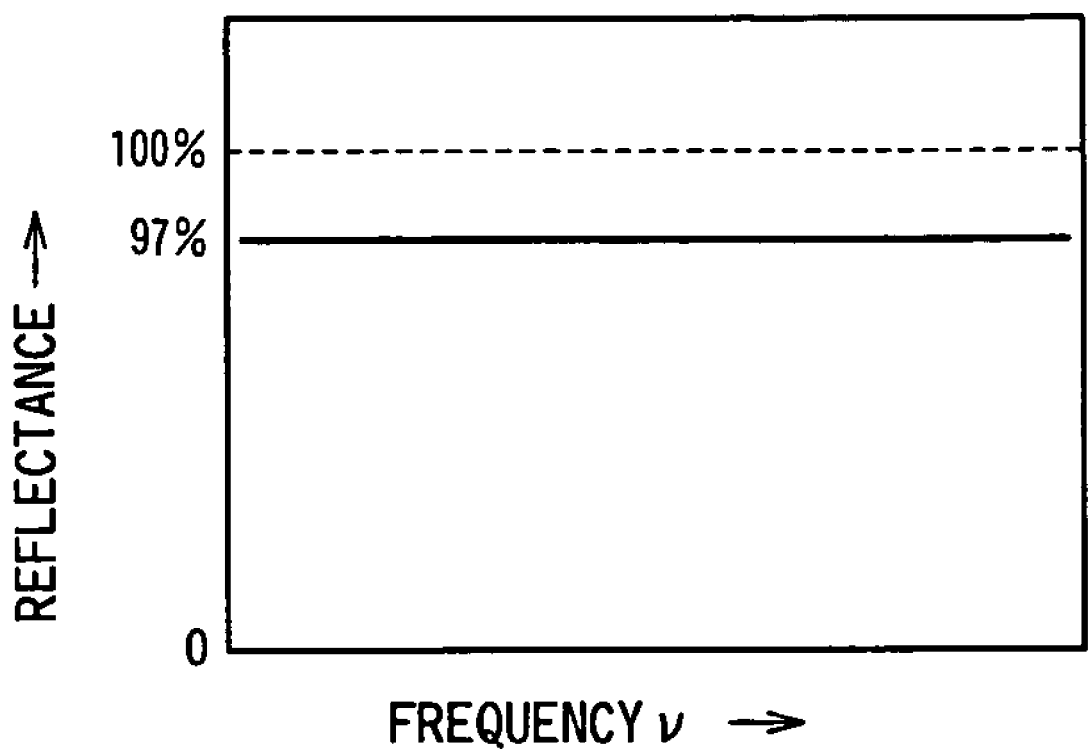
FIG. 12 shows an example of the reflectance set to the outgoing side reflecting mirror for diminishing the loss of the resonant light.

For diminishing the loss of the resonant light, the outgoing side reflecting mirror 123 maintains its constant high reflectance, as shown in FIG. 12. In order to cause the interference of the generated optical frequency combs with the light under measurement, the outgoing side reflecting mirror 123 has to radiate the light to outside at a preset proportion. Thus, the reflectance is set to a value slightly lower than 100%, for example, to 97%, as shown in FIG. 12.

The outgoing side reflecting mirror 123 controls the curve of reflectance distribution to a flat shape to radiate the generated optical frequency combs of the wide range in its entirety to outside. Meanwhile, the curve of reflectance distribution may also be intentionally controlled to curves of variable profiles for flattening out the spectrum of the outgoing light.

With the bulk type optical frequency comb generator 11, as described above, the sidebands of the frequency range outside the frequency $v_1$ of the incident light can be prevented from being transmitted to outside, while the optical loss at the time of light incidence can be reduced further.

According to the present invention, a filter for passing only a preset band may be provided on the light radiating side, as in the case of a bulk type optical frequency comb generator 12, as now explained.

Figure 13:
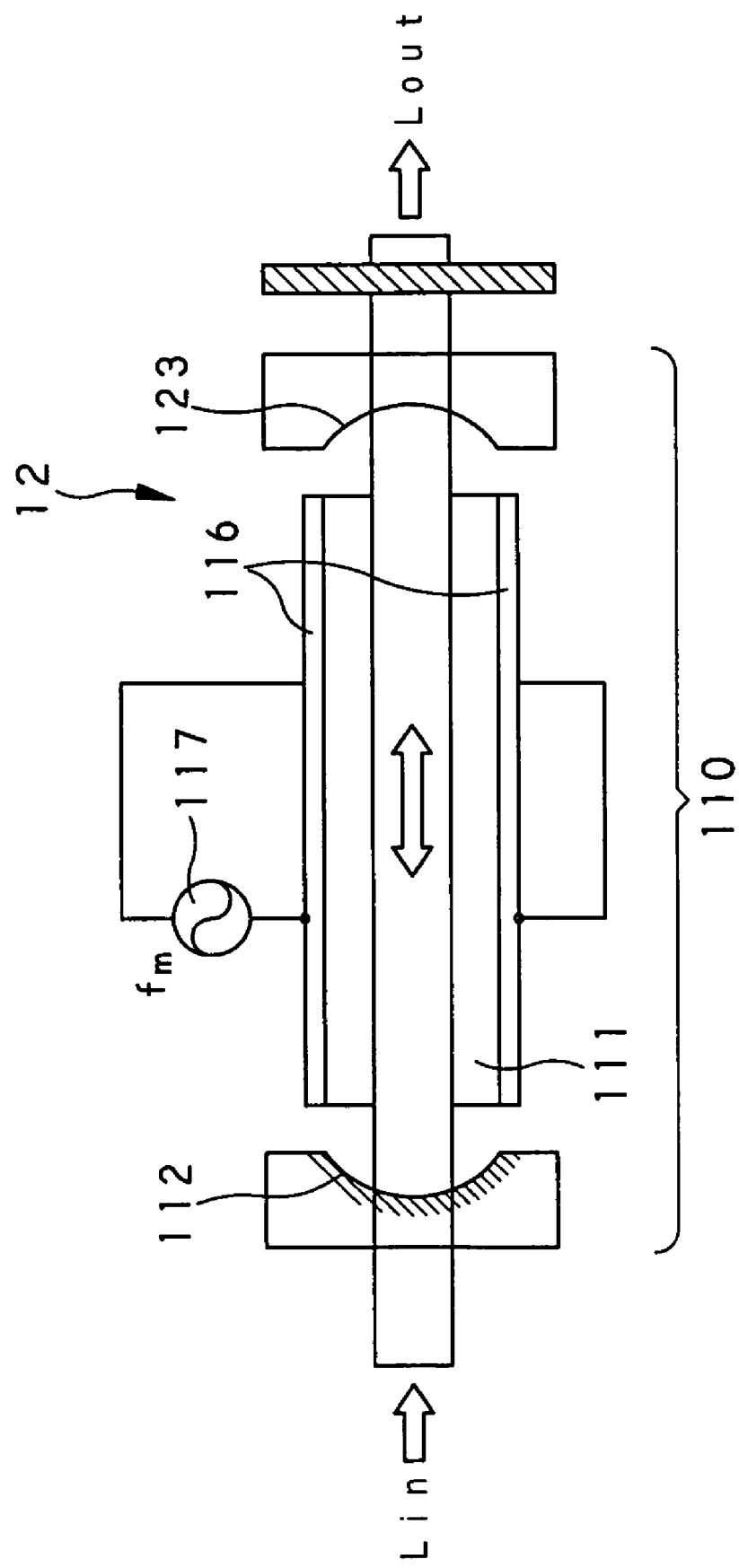
FIG. 13 shows a bulk type optical frequency comb generator in which a filter for passing only a preset band is provided on the outgoing side.
Figure 14:
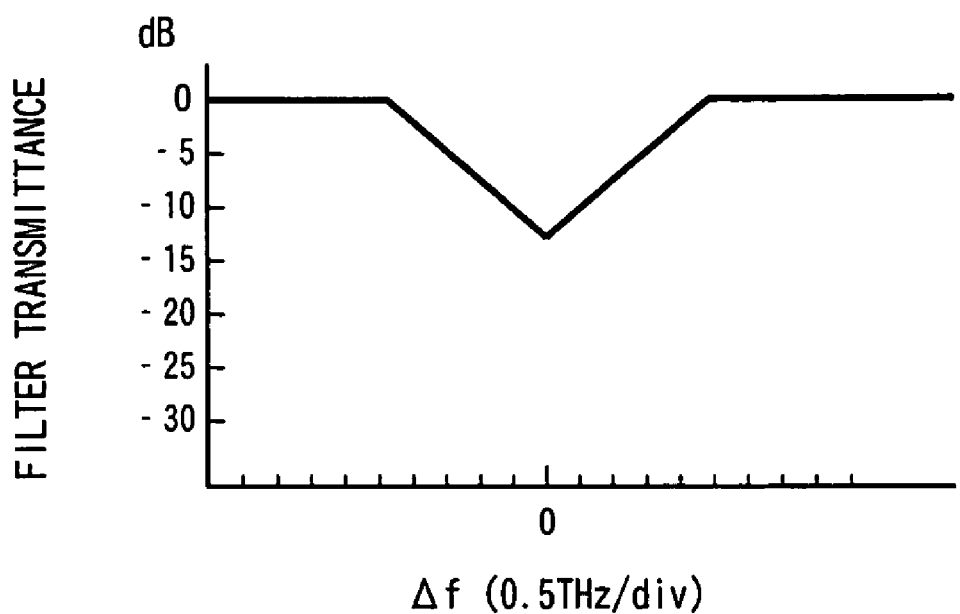
FIG. 14 shows the transmittance of the filter to each frequency.

FIG. 13 shows the structure of the bulk type optical frequency comb generator 12. The parts or components which are the same as those of the bulk type optical frequency comb generator 10 are denoted by the same reference numerals and are not explained specifically.

This bulk type optical frequency comb generator 11 includes an optical phase modulator 111, an optical resonator 110, composed of an incident side reflecting mirror 112 and an outgoing side reflecting mirror 123, mounted facing each other with the optical phase modulator 111 in between, a filter 114, a pair of electrodes 116, and an oscillator 117.

The optical resonator 110 causes light resonation of light Lin, incident via incident side reflecting mirror 112 with a low transmittance, in a space between the incident side reflecting mirror 112 and the outgoing side reflecting mirror 123, to radiate a portion Lout of the resonated light through the outgoing side reflecting mirror 123. The incident side reflecting mirror 112 and the outgoing side reflecting mirror 123 are provided for causing light resonation of the light incident on the optical resonator 110. This light resonation is produced by reflection of the light traveling back and forth through the inside of the optical phase modulator 111.

The filter 114 causes the light, radiated from the outgoing side reflecting mirror 123, to be radiated to outside at a preset value of transmittance. The transmittance of the filter 114 is set so as to be smallest at the frequency $v_1$ of the incident light. The transmittance of the filter 114 is set so as to be higher than the transmittance at $v_1$ in the frequency band other than the frequency $v_1$, and may be occasionally set to close to 100%. The gradient in the curve of the transmittance distribution may not only be steep but may also be moderate.

Figure 15:
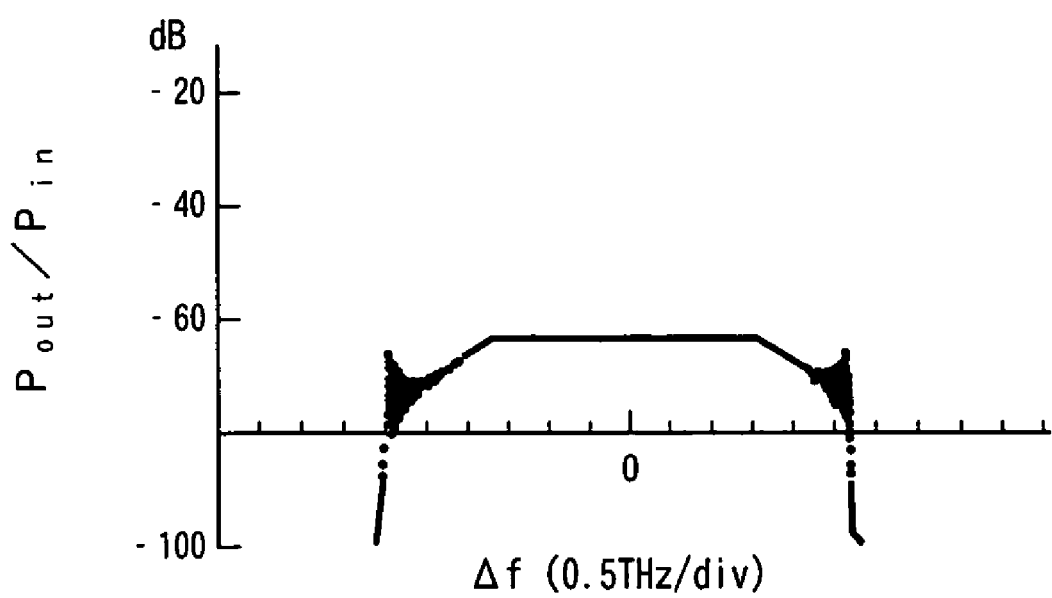
FIG. 15 shows the light intensity distribution for each frequency of the light radiated from the filter.

The curve of transmittance distribution may be such that, with an eye directed to the light intensity, exponentially changed with the frequency difference $\Delta f$, the light intensity distribution of the light radiated from the filter 114 is flattened out by exponentially changing the transmittance. The transmittance of the filter 114 is set for flattening out the light intensity distribution of the light radiated from the filter 114, based on the equation (1). That is, the transmittance of the filter 114 is exponentially changed, responsive to the wavelength, for flattening out the optical output $P_{out}$ of the outgoing light which is changed exponentially responsive to the wavelength. FIG. 15 shows an instance where the transmittance of the filter 114 is exponentially changed depending on the frequency difference $\Delta f$ to flatten out the distribution of intensity of the light radiated from the filter 114 ($=P_{out}/P_{in}$).

That is, with this bulk type optical frequency comb generator 12, the distribution of intensity of the light radiated from the filter 114 may be flattened out by controlling the intensity of distribution of the light radiated from the filter 114. Thus, according to the present invention, the optical frequency combs, capable of measuring the frequency of the light under measurement to higher accuracy, may be generated even in an area exhibiting marked frequency differential from the frequency of the incident light.

Figure 16:
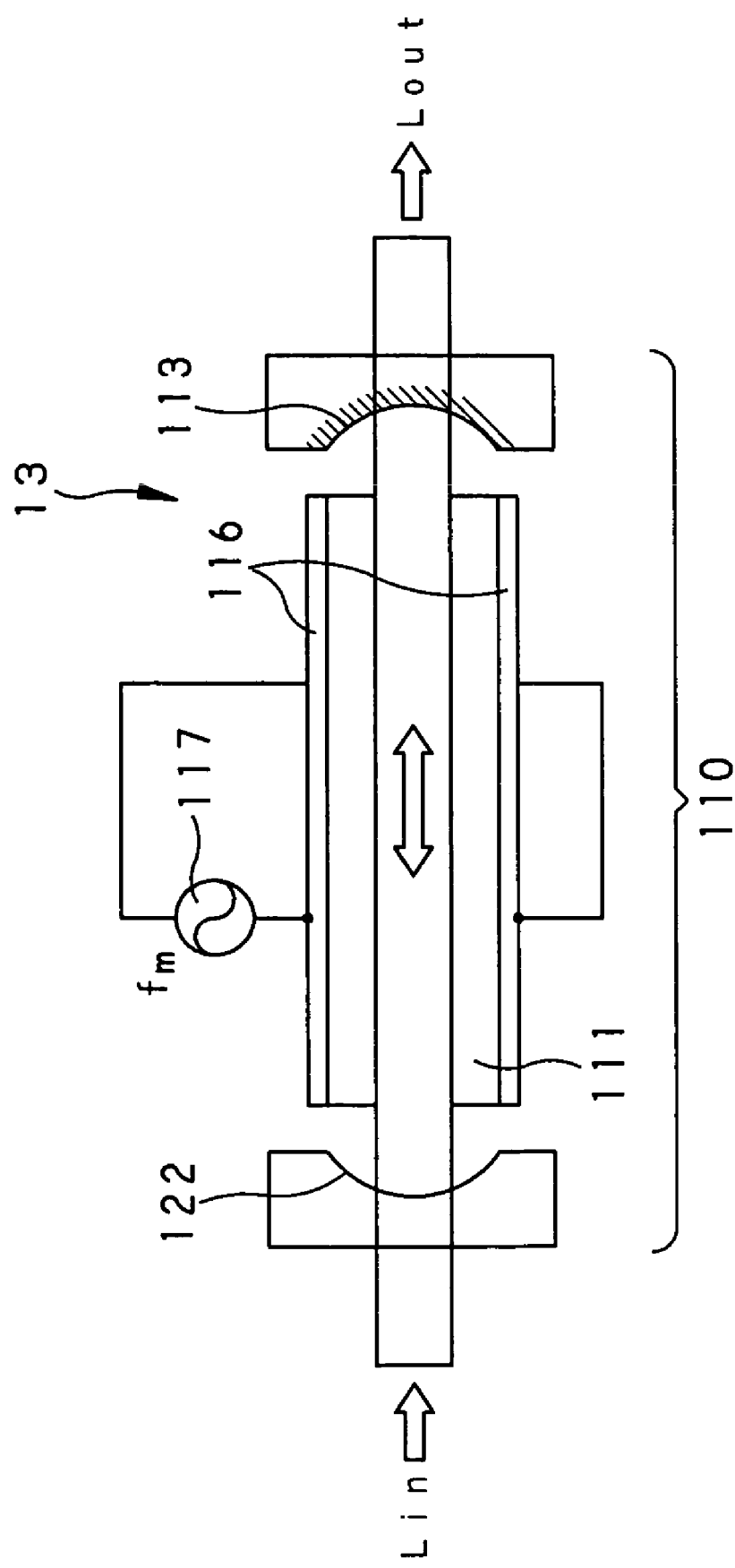
FIG. 16 shows a bulk type optical frequency comb generator in which a preset transmittance is set only for the outgoing side reflecting mirror.

FIG. 16 shows a bulk type optical frequency comb generator 13 in which the aforementioned transmittance is set only to the outgoing side reflecting mirror 113. The parts or components which are the same as those of the bulk type optical frequency comb generator 10 are denoted by the same reference numerals and are not explained specifically.

This bulk type optical frequency comb generator 13 includes an optical phase modulator 111, an optical resonator 110, composed of an incident side reflecting mirror 122 and an outgoing side reflecting mirror 113, mounted facing each other with the optical phase modulator 111 in-between, a pair of electrodes 116, and an oscillator 117.

The optical resonator 110 causes light resonation of light Lin, incident via incident side reflecting mirror 122 with a low transmittance, in a space between the incident side reflecting mirror 112 and the outgoing side reflecting mirror 113, to radiate a portion Lout of the incident light through the outgoing side reflecting mirror 113.

The incident side reflecting mirror 122 is mounted on the light incident side of the optical phase modulator 111 and is supplied with the light Lin with the frequency $v_1$ from a light source, not shown. This incident side reflecting mirror 122 also reflects the light reflected by the outgoing side reflecting mirror 113 and transmitted through the optical phase modulator 111. The transmittance of the incident side reflecting mirror 112 is optionally set such that the present invention is not limited to a case where the transmittance of the incident side reflecting mirror is set so as to be maximum at the frequency $v_1$ of the incident light as described above.

On the other hand, the transmittance of the outgoing side reflecting mirror 113 is set from one frequency to another in dependence upon the light intensity of the generated sidebands, as descried above.

With the above-described bulk type optical frequency comb generator 13, the generated sidebands may be flattened out as the intensity of the radiated light is prevented from being lowered. Thus, with the bulk type optical frequency comb generator 13, the frequency of the light under measurement may be measured to a high accuracy even in an area where there is marked frequency differential from the frequency of the incident light.

Figure 17:
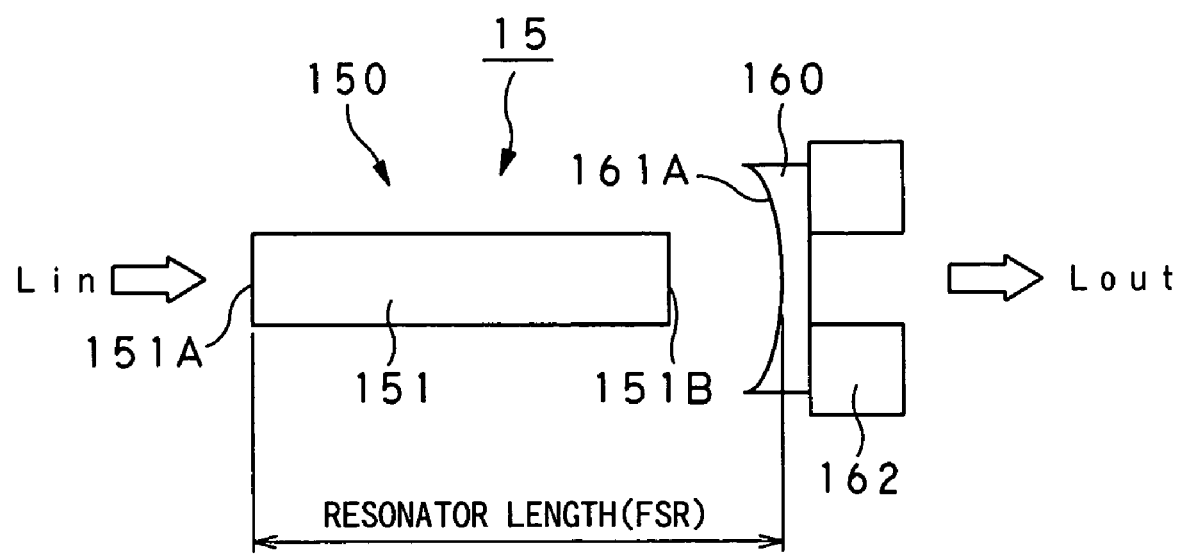
FIG. 17 shows the structure of a semi-monolithic bulk type optical frequency comb generator.
Figure 18:
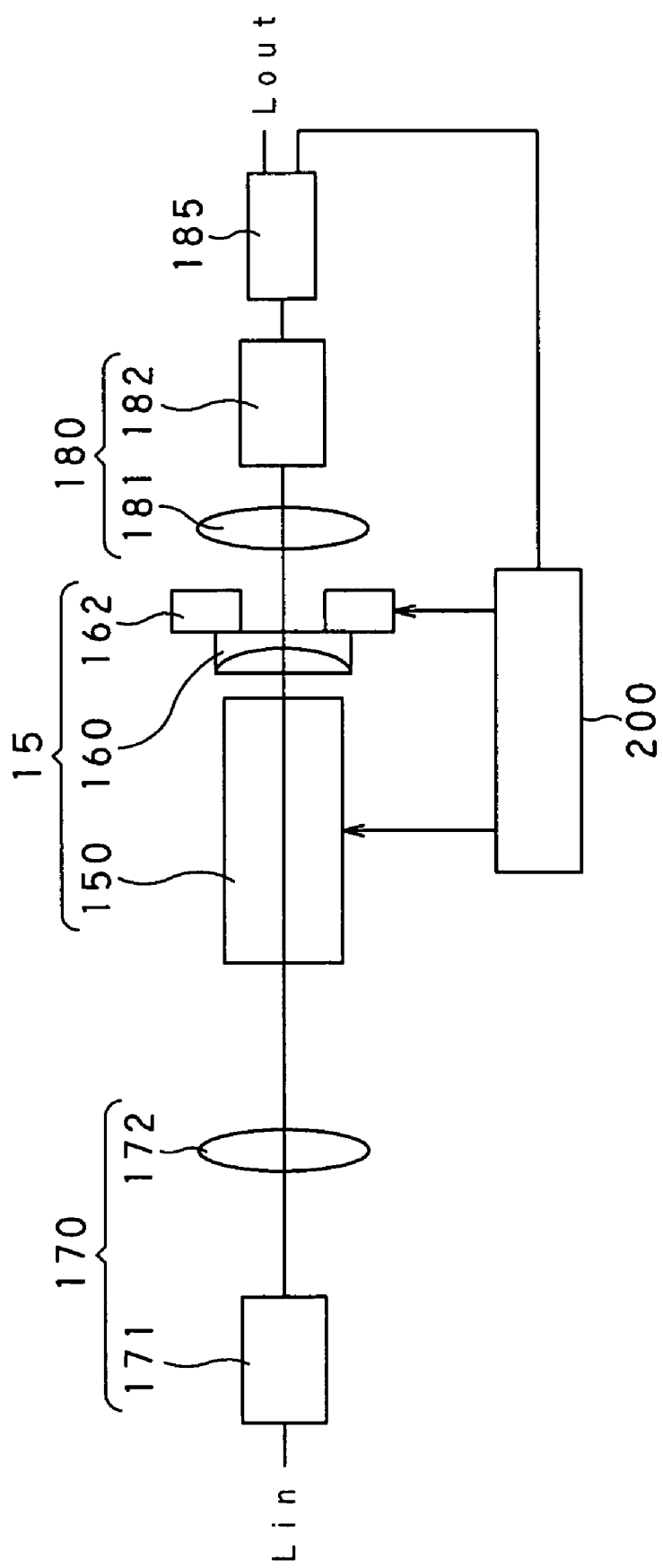
FIG. 18 schematically shows an example of the overall structure of a semi-monolithic bulk type optical frequency comb generator.

It is noted that the bulk type optical frequency comb generator 13 according to the present invention is not limited to the above-described embodiment and may also be applied to a semi-monolithic bulk type optical frequency comb generator 15 shown for example in FIG. 17.

This bulk type optical frequency comb generator 15 includes a semi-monolithic optical modulator 150, composed of an electro-optical crystal 151, through which is passed a light beam for optical modulation, and a movable mirror 160, arranged on the light radiating side of the semi-monolithic optical modulator 150.

This semi-monolithic optical modulator 150 is formed by the electro-optical crystal 151 of, for example, lithium niobate ($LiNbO_3$), capable of phase-modulating the light with voltage, and includes, on its light incident side end face, a high reflecting film 151A, formed by HR coating, while including, on its light radiating side end face, a non-reflecting film 151B, formed by AR coating. The transmittance of the high reflecting film 151A may be set so as to be of a maximum value at the frequency $v_1$ of the incident light, as shown in FIG. 4A.

The movable mirror 160 includes a high reflecting mirror 161A, which high reflecting mirror 161A forms a resonator with the high reflecting film 151A formed on the incident end face of the semi-monolithic optical modulator 150. This movable mirror 160 is adapted for being moved by an electro-mechanical transducer 162, such as PZT. The transmittance of the high reflecting film 151A may be set from one frequency to another, in dependence upon the light intensity of the generated sidebands, as shown in FIG. 6.

With the optical frequency comb generator 100 of the semi-monolithic structure, made up by the semi-monolithic optical modulator 150, composed of the electro-optical crystal 151 having the high reflecting film 151A on the light incident side, and the movable mirror 160, mounted on the light radiating side of the semi-monolithic optical modulator 150 for movement by the electro-mechanical transducer 162, such as PZT, and carrying a high reflecting film 161A, coarse adjustment of the length of the resonator (FSR) may be made by causing movement of the entire mirror 160, secured to the electro-mechanical transducer 162, for position adjustment, while coarse adjustment of the length of the resonator (FSR) may be made by causing movement of the movable mirror 160, secured to the electro-mechanical transducer 162, in its entirety.

That is, with this bulk type optical frequency comb generator 15, which is of the monolithic structure made up by the semi-monolithic optical modulator 150, composed of the electro-optical crystal 151 having the high reflecting film 151A on the light incident side, and the movable mirror 160, mounted on the light radiating side of the semi-monolithic optical modulator 150 for movement by the electro-mechanical transducer 162, such as PZT, and carrying a high reflecting film 161A, the modulation frequency may be set optionally without dependency on the crystal length of the electro-optical crystal 151. Although the high reflecting film 151A is formed on the incident end side and the movable mirror 160 is provided on the light radiating side, only by way of an example, in FIG. 17, the movable mirror 160 and the high reflecting film 151A may be provided on the light incident side and on the light radiating side, respectively. In such case, the light Lin is supplied through the high reflecting film 161A of the movable mirror 160, while the resonated light is radiated to outside via the high reflecting film 151A.

On the bulk type optical frequency comb generator 15 of the above-described structure, the light beam Lin, as a fundamental wave, is incident via an incident side optical system 170, made up by a fiber input collimator optical transducer 171 and a light condensing lens 172. In the semi-monolithic optical modulator 150, the light incident thereon is modulated in phase to take out an optical frequency comb Lout via a radiating side formed by a high reflecting film. The optical frequency comb Lout, thus taken out, is radiated through a light condensing lens 181 and a radiating side optical system 180 formed by a fiber output collimator optical transducer 182.

Figure 19:
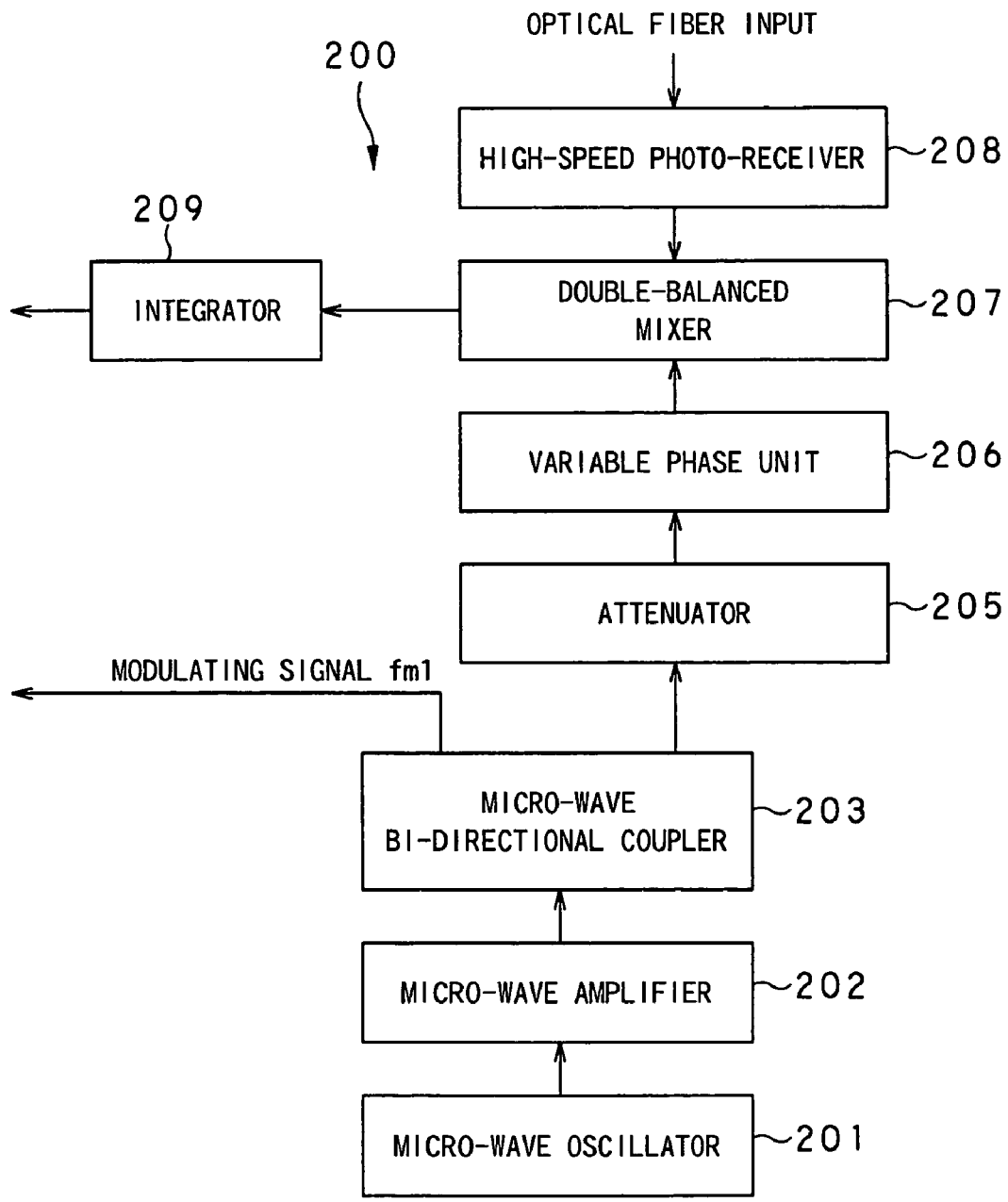
FIG. 19 shows a structure of a controller of an optical frequency comb generator.

In this bulk type optical frequency comb generator 15, the optical frequency comb Lout, radiated from the light radiating side optical system 180, is partially split by an optical coupler 185 and a fraction thereof produced on splitting is sent to a optical frequency comb generator controller 200 configured as shown in FIG. 19.

The optical frequency comb generator controller 200 includes a micro-wave oscillator 201 for generating microwave signals, to be supplied as modulation signal fm1 to the semi-monolithic optical modulator 150. The micro-wave signals, generated by the micro-wave oscillator 201, are amplified by a micro-wave amplifier 202 and supplied via a micro-wave directivity coupler 203 as a modulation signal fm1 to the semi-monolithic optical modulator 150, while being supplied from the micro-wave directivity coupler 203 through an attenuator 205 and a variable phase unit 206 to a double-balanced mixer 207.

The optical frequency comb generator controller 200 applies the micro-wave signal as the modulation signal fm1 to an electrode, not shown, of the semi-monolithic optical modulator 150. This semi-monolithic optical modulator 150 modulates the phase of the light beam Lin, as the fundamental wave, incident via the incident side optical system 170, in keeping with the modulation signal fm1, to output the optical frequency comb Lout via the movable mirror 160 carrying the high reflecting film 161A.

The optical frequency comb generator controller 200 also includes an optical fiber input high-speed photo-receiver 208, supplied with the fraction of the optical frequency comb Lout, obtained on splitting by the optical coupler 185. The output of this photo-receiver 208 is supplied to the double-balanced mixer 207. The movable mirror 160 is feedback-controlled by an output of the double-balanced mixer 207 being fed back through an integrator 209 to the electro-mechanical transducer 162.

With the above-described optical frequency comb generator 15, the modulation frequency may be optionally set, in addition to the effect proper to the optical frequency comb generator 10, without dependency on the optical frequency comb generator 10. Moreover, with the present optical frequency comb generator 15, the number of component parts may be reduced. Additionally, since the movable mirror 160 is directly coated with the high reflecting film 161A, leakage of light to be resonated may be prevented from occurring more positively.

With the above-described optical frequency comb generator 15, the light loss may be suppressed to a minimum as the light intensity distribution in the generated sidebands is flattened out, so that the frequency of the light being measured may be measured to a higher accuracy in all bands, while the modulation frequency may be optionally set without dependency on the crystal length of the electro-optical crystal.

With the above-described optical frequency comb generator 15, a large number of light beams, having different wavelengths, may be generated by applying it to the light transmission apparatus in the wavelength division multiplexing communication system, and modulation may be applied with the generated light as the carrier wave, to generate modulated optical signals, which modulated optical signals may subsequently be multiplexed and sent out.

The present invention is not limited to the above-described embodiment of the bulk type optical frequency comb generator 10 and may be applied to a U-shaped bulk type optical frequency comb generator 17.

Referring to FIG. 20A, the bulk type optical frequency comb generator 17 is made up by a bulk type optical resonator 210, through which is passed a light beam for optical modulation, and a cavity micro-wave resonator 220 having enclosed therein the bulk type optical resonator 210.

The bulk type optical resonator 210 is a monolithic optical resonator comprising an electro-optical crystal, such as lithium niobate, capable of phase-modulating the light with the voltage, and which is provided with an incident end 210A as well as a radiating end 210B, each carrying a high reflecting film.

The transmittance of the incident end 210A is set so as to be maximum at the frequency $v_1$ of the incident light. The transmittance of the light radiating end 210B is set from one frequency to another, in dependency upon the light intensity of the generated sidebands, as shown in FIG. 6.

The cavity micro-wave resonator 220 includes a cavity 223 resonated to the micro-wave. The cavity 223 of the cavity micro-wave resonator 220 is U-shaped and made up by a center cavity 223B, having mounted therein the bulk type optical resonator 210, an incident side cavity 223A and a radiating side cavity 223C, arranged ahead and in rear of the bulk type optical resonator 21, respectively, as shown in FIG. 20B. The incident side cavity 223A and the radiating side cavity 223C, arranged ahead and in rear of the bulk type optical resonator, respectively, are each adjusted to a cavity length A which is a width B of the cavity and one-fourth the wavelength λ of the resonant frequency represented by $$\lambda = 1/\sqrt{\{1/\lambda_0^2 - 1/(4B^2)\}}$$

where B is the cavity width, the propagation wavelength $\lambda_0$ in vacuum=C/fm, C being the velocity of light, that is, A=λ/4. This allows managing control so that the impedance to the cavity 223 on the crystal end face will be large.

In the cavity micro-wave resonator 220 of the above-described structure, in which the incident side cavity 223A and the radiating side cavity 223C are provided ahead of and in rear of the bulk type optical frequency comb generator 210, respectively, and are each of a cavity length equal to one-fourth the wavelength of the resonant frequency, the bulk type optical frequency comb generator 210 is in operation with the same resonant mode as that when there is provided only the center cavity 223B, such as to suppress leakage of the micro-wave. Moreover, with the cavity micro-wave resonator 220, the size is not increased by the U-shape of the cavity 223, despite the fact that the incident side cavity 223A and the radiating side cavity 223C are provided ahead of and in rear of the bulk type micro-wave resonator 210, respectively.

The cavity micro-wave resonator 220 is made up by a first metal block 222, having a groove 221 for housing the bulk type optical frequency comb generator 210 therein, a second metal block 224, defining the cavity 223 resonated with the micro-wave along with the first metal block 222, a mounting plate 225 for mounting the second metal block 224 in a groove 221 of the first metal block 222, and a metal cover 240 for covering up the sidewall of the first metal block 222. The center cavity 223B is formed for extending along the groove 221 of the first metal block 222, the incident side cavity 223A and the radiating side cavity 223C are formed for extending along the sidewall of the first metal block 222, and the bulk type optical frequency comb generator 210, arranged in the groove 221, is clamped between the bottom surface 221A of the groove 221 of the first metal block 222 and the second metal block 224. Meanwhile, the second metal block 224 is secured to the mounting plate 225 via an insulating plate 230 formed e.g. of mica.

The cavity micro-wave resonator 220 is also provided with an incident light window 223WI and an outgoing light window 223WO in register with an incident end and an outgoing end of the bulk type micro-wave resonator 210 enclosed therein.

The cavity micro-wave resonator 220 is provided with a connector pin 229, supplied with micro-wave signals from a micro-wave power supply, not shown. The connector pin is provided for extending through the first metal block 222 into abutment with the second metal block 224. The cavity micro-wave resonator 220 is resonated with micro-wave signals, supplied to this connector pin 229, to apply an electrical field corresponding to the micro-wave signals to the electro-optical crystal forming the bulk type micro-wave resonator 210.

The bulk type micro-wave resonator 210 is enclosed within the cavity micro-wave resonator 220, so that, as the cavity micro-wave resonator 220 is in resonation with the micro-wave signals, supplied to the connector pin 229, an electrical field corresponding to the micro-wave signals is applied, such that the refractive index is changed with the micro-wave signals. Consequently, the bulk type optical frequency comb generator 210 operates as a bulk type optical phase modulator applying optical phase modulation corresponding to the micro-wave signals to the light beam Lin, as the fundamental wave, incident on the incident end reflecting film.

That is, with the bulk type optical frequency comb generator 17, the light beam Lin, as a fundamental wave, incident via the incident light window 223WI through the incident end reflecting film to the bulk type micro-wave resonator 210, may be subjected to optical phase modulation in keeping with the micro-wave signals. Thus, the bulk type optical frequency comb generator 17 is able to phase-modulate the light beam Lin to radiate the optical frequency comb Lout through the radiating end reflecting film via the outgoing light window 223WO.

Moreover, with the present bulk type optical frequency comb generator 17, the light loss may be suppressed to a minimum to generate the optical frequency combs efficiently, as the light intensity distribution in the generated sideband is suppressed to a minimum, by setting the transmittance of the incident end 210A as being the transmittance of the incident side reflecting mirror 112 shown in FIG. 4A and by setting the transmittance of the outgoing end 210B as being the transmittance of the outgoing side reflecting mirror 113 shown in FIG. 6.

Figure 21:
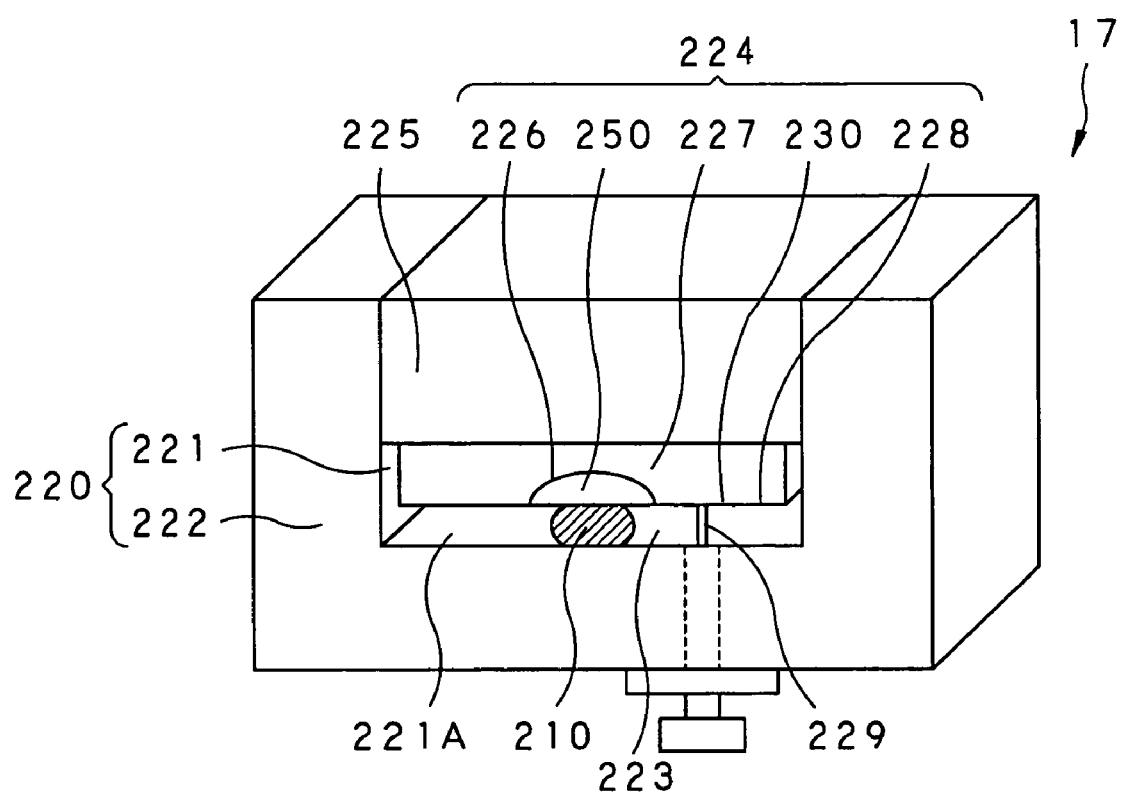
FIG. 21 shows a modification of a U-shaped bulk type optical frequency comb generator.

If, as in the present bulk type optical frequency comb generator 17, the bulk type micro-wave resonator 210 is clamped between the bottom surface 221A of the groove 221 of the first metal block 222 and the second metal block 224, the second metal block 224 is formed by a metal block 227 provided with a recess 226 and a metal plate spring 228 arranged on the surface of the recess 226, the bulk type micro-wave resonator 210 is arranged in the groove 221 of the first metal block 222 for facing the recess 226 via the metal plate spring 228, and the bulk type micro-wave resonator 210 is elastically clamped and secured by the metal plate spring 228 and the bottom surface 221A of the groove 221 of the first metal block 222, as shown in FIG. 21. Thus, with the bulk type optical frequency comb generator 17, the spacing D between the bottom surface 221A of the groove 221 of the first metal block 222 and the second metal block 224 may be finely adjusted by elastically displacing the metal plate spring 228.

In the bulk type optical frequency comb generator 17, shown in FIG. 20, the second metal block 224 is bonded and secured to the mounting plate 225 via the insulating plate 230 formed of an insulating material, such as mica. It is however possible to arrange the insulating plate 230 between the metal block 227 and the metal plate spring 228, and to secure the second metal block 224 directly to the mounting plate 225, as shown in FIG. 21.

A thermally conducting material 250, such as graphite, may be housed in a recess 226 formed in the second metal block 224, whereby the heat generated in the electro-optical crystal making up the bulk type micro-wave resonator 210 may be efficiently led to the second metal block 224 through the thermally conducting material 250 to the second metal block 224. Thus, the adverse effect, such as expansion of the electro-optical crystal, due to heat evolution, may be diminished to permit the bulk type optical frequency comb generator 17 to be operated in stability.

With the bulk type optical frequency comb generator 17, the cavity 223 resonated with the micro-waves of the cavity micro-wave resonator 220 is of the U-shape. Alternatively, a closed-loop cavity may also be used by both ends of the incident side cavity 223A and the radiating side cavity 223C communicating with each other.

A high reflecting film 210A may be formed on the incident side end of the bulk type optical frequency comb generator 17, the radiating end of which may then be formed as a movable mirror, as shown in FIG. 17, such that the bulk type optical frequency comb generator operates as a semi-monolithic optical frequency comb generator.

The bulk type optical frequency comb generator 17 of the above-described structure may also be applied to the optical transmission apparatus in the wavelength division multiplexing communication system to generate a large number of light beams having different wavelengths. The so generated light beams may then be used as a carrier wave for modulation, in order to generate optically modulated signals, which signals may then be multiplexed for transmission.

Figure 22:
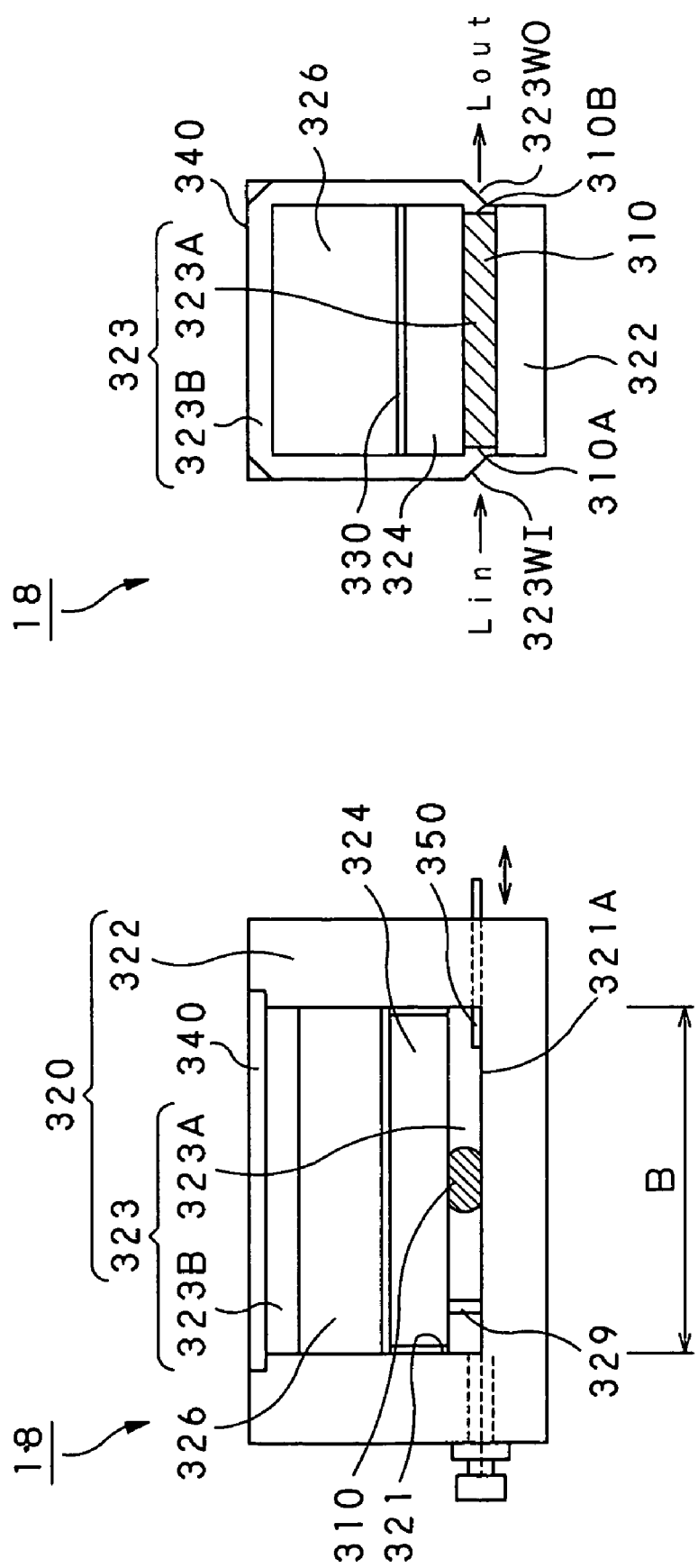
FIGS. 22A and 22B show another structure of a U-shaped bulk type optical frequency comb generator.

FIGS. 22A and 22B show an illustrative structure of a bulk type optical frequency comb generator 18 having a cavity 323 formed to a closed loop shape.

This bulk type optical frequency comb generator 18 is made up by a bulk type micro-wave resonator 310, formed of an electro-optical crystal, for permitting the passage of the light beam for optical modulation therethrough, and a cavity micro-wave resonator 320, having enclosed therein the bulk type micro-wave resonator 310, as shown in FIG. 22A.

The bulk type micro-wave resonator 310 is an optical resonator of a monolithic structure comprising an electro-optical crystal capable of phase-modulating the light with voltage, such as lithium niobate, and an incident end 310A as well as a radiating end 310B, each being formed e.g. by a high reflecting film. The transmittance of the incident end 310A is set so as to be maximum at the frequency $v_1$ of the incident light, as shown in FIG. 4A. The transmittance of the radiating end 310B is set from one frequency to another, depending on the light intensity of the generated sideband, as shown in FIG. 6.

The cavity micro-wave resonator 320 is provided with a cavity 323, formed to a closed loop shape, as shown in FIG. 22B. This cavity 323 is made up by a cavity section 323A, having the bulk type micro-wave resonator 310 enclosed therein, and a U-shaped cavity section 323B for communicating both ends of the cavity section 323A.

The cavity micro-wave resonator 320 is made up by a first metal block 322, having a groove 321, in which is enclosed the bulk type micro-wave resonator 310, a second metal block 324 and a metal cover 340, delimiting the cavity 323 of the closed loop shape, resonated with the micro-waves, along with the first metal block 322, and a mounting plate 326 for mounting the second metal block 324 in a groove 321 of the first metal block 322. The cavity 323 of the closed loop shape is defined within the groove 321 of the first metal block 322 covered up by the metal cover 340. In this cavity micro-wave resonator 320, the bulk type micro-wave resonator 310 is arranged in the groove 321 of the first metal block 222, and is held by being clamped between the bottom surface 321A of the groove 321 and the second metal block 324. The second metal block 324 is bonded and secured to the mounting plate 325 via an insulating pate 330 formed of an insulating material, such as mica.

In this cavity micro-wave resonator 320, a frequency adjustment plate 350 is introduced from outside into the cavity section 323A in a controlled amount to adjust the resonant frequency.

The width B of the cavity is set to $$B = \lambda_0/2$$

where the propagation wavelength in vacuum $\lambda_0 = C/fm$, where C is the light velocity.

An incident light window 323WI and an outgoing light window 323WO are formed in the positions corresponding to the incident end and the outgoing end of the bulk type micro-wave resonator 310 housed in the groove 321 of the first metal block 322, respectively.

The cavity micro-wave resonator 320 is provided with a connector pin 329, supplied with micro-wave signals from a micro-wave power supply, not shown. The connector pin is provided for abutment against the second metal block 324. The cavity micro-wave resonator is resonated with micro-wave signals, supplied to this connector pin, to apply an electrical field corresponding to the micro-wave signals to the electro-optical crystal forming the bulk type optical resonator 310.

The bulk type micro-wave resonator 310 is enclosed within the cavity micro-wave resonator 320, so that, as the cavity micro-wave resonator 320 is in resonation with the micro-wave signals, supplied to the connector pin, an electrical field corresponding to the micro-wave signals is applied, such that the refractive index is changed with the micro-wave signals. Consequently, the bulk type optical frequency comb generator 310 operates as a bulk type optical phase modulator applying optical phase modulation corresponding to the micro-wave signals to the light beam Lin, as the fundamental wave, incident via the incident end reflecting film.

That is, with the bulk type optical frequency comb generator 18, the light beam Lin, as a fundamental wave, incident through the incident end reflecting film to the bulk type micro-wave resonator 310, may be subjected to optical phase modulation in keeping with the micro-wave signals. Thus, the bulk type optical frequency comb generator is able to phase-modulate the light beam Lin to radiate the optical frequency comb Lout through the radiating end reflecting film.

Moreover, with the present bulk type micro-wave resonator 320, in which the cavity 323 is in the form of a closed loop, it is possible to suppress the leakage of the micro-waves, to secure the resonant mode, and to reduce the size of the resonator. Moreover, with the bulk type optical frequency comb generator 18, in which the transmittance at the incident end 310A and that at the outgoing end 310B are set as described above, the light loss may be suppressed to a minimum, as the light intensity distribution in the generated sidebands is flattened out, while the optical frequency comb may be generated efficiently.

It should be noted that the optical frequency comb generator according to the present invention is applied not only to the bulk type optical frequency comb generator 10 but also to a waveguide channel type optical frequency comb generator 40.

Figure 23:
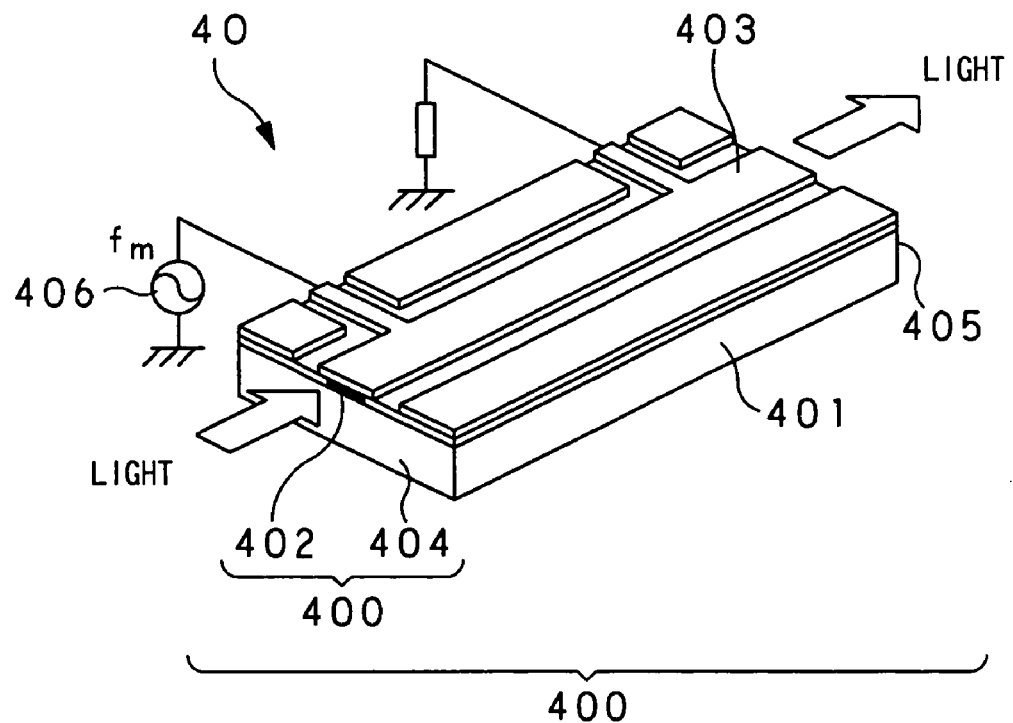
FIG. 23 shows the structure of a waveguide channel type optical frequency comb generator.

FIG. 23 shows the structure of the waveguide channel type optical frequency comb generator 40 comprising a waveguide channel type optical modulator 400. The waveguide channel type optical modulator 400 is made up by a substrate 401, a waveguide channel 402, an electrode 403, a light incident side reflecting film 404, a light outgoing side reflecting film 405 and an oscillator 406.

The substrate 401 is a large-sized crystal of, for example, $LiNbO_3$ or GaAs, 3 to 4 inch in diameter, grown by, for example, a pulling method, and sliced into wafers. A layer of the waveguide channel 402 is grown by epitaxial technique on the so sliced substrate 401 or is formed on the heated substrate by Ti diffusion. To this end, the substrate is routinely processed with mechanical or chemical polishing.

The waveguide channel 402 is arranged for propagating the light. The refractive index of the layer forming the waveguide channel 402 is set so as to be higher than that of the other layers, such as the substrate. The light incident on the waveguide channel 402 is propagated as it undergoes total reflection on the boundary surface of the waveguide channel 402.

The electrode 403 is formed e.g. of a metal material, such as Ti, Pt or Au, and routes the electrical signal of a frequency fm from outside to the waveguide channel 402. The direction of light propagation in the waveguide channel and the proceeding direction of the modulating electrical field become identical by provision of the electrode 403.

The light incident side reflecting film 404 and the light outgoing side reflecting film 405 are provided for causing the resonation of the light incident on the waveguide channel 402. The resonation is produced by reflection in round trip of the light traveling in the waveguide channel 402. The oscillator 406 is connected to the electrode 403 to supply electrical signals of the frequency fm.

The light incident side reflecting film 404 is arranged on the light incident side of the waveguide channel type optical modulator 400 and is supplied with the incident light with the frequency $v_1$ from a light source, not shown. This light incident side reflecting film 404 reflects the light reflected by the light outgoing side reflecting film 405 and which has traveled in the waveguide channel 402.

The light outgoing side reflecting film 405 is arranged on the light radiating side of the waveguide channel type optical modulator 400 to reflect the light which has traversed the waveguide channel 402. The light outgoing side reflecting film 405 also radiates the light, which has traversed the waveguide channel 402, to outside at a certain preset proportion.

In the above-described waveguide channel type optical frequency comb generator 40, in which electrical signals synchronized with the time the light travels in round trip through the waveguide channel 402 are supplied from the electrode 403 to the waveguide channel type optical modulator 400, it is possible to apply phase modulation deeper by tens of times than in case the light travels only once through the waveguide channel 402. Thus, similarly to the bulk type optical frequency comb generator 10, the waveguide channel type optical frequency comb generator 40 is able to generate the optical frequency comb having sidebands extending over a wide range, with the frequency gap between the neighboring sidebands being equal to the frequency of the input electrical signals.

The transmittance of the light incident side reflecting film 404 forming the waveguide channel type optical frequency comb generator 40 is equivalent to the transmittance of the above-mentioned incident side reflecting mirror 112. That is, the transmittance of the light incident side reflecting film 404 is set so as to be maximum at the frequency $v_1$ of the incident light.

In this manner, the light of the frequency $v_1$, supplied from the light source, may readily fall on the waveguide channel 402 through the light incident side reflecting film 404. Moreover, a large number of sidebands may be generated over a wide range by introducing modulating signals to the light which is undergoing the resonation on the waveguide channel 402. Moreover, the transmittance of the light incident side reflecting film 404 is set to a lower value for the frequency band different than the frequency $v_1$, so that, as shown in FIG. 4B, the majority of the sidebands of the optical frequency combs generated are not transmitted to outside through the light incident side reflecting film 404, but are repeatedly reflected back and forth within the waveguide channel 402.

That is, with the present waveguide channel type optical frequency comb generator 40, the sidebands in a frequency range outside the frequency $v_1$ of the incident light may be prohibited from walking off to outside. Thus, with the waveguide channel type optical frequency comb generator 40, the light losses may be diminished, such that the optical frequency comb may be generated efficiently. Moreover, with the waveguide channel type optical frequency comb generator 40, the transmittance is maximum at the frequency $v_1$ of the incident light to decrease the loss of the incident light, and hence the efficiency may be improved further.

The transmittance of the light outgoing side reflecting film 405 of the waveguide channel type optical frequency comb generator 40 is equivalent to that of the outgoing side reflecting mirror 113. That is, the transmittance of the outgoing side reflecting mirror 113 is set from one frequency to another, depending on the light intensity of the generated sidebands.

Thus, according to the present invention, the generated sidebands may be flattened out as the light intensity of the outgoing light is prevented from being lowered.

That is, in the waveguide channel type optical frequency comb generator 40 according to the present invention, in which light losses may be suppressed to a minimum as the light intensity distribution in the generated sidebands is flattened out, the frequency of light being measured may be measured to high accuracy even in a band where there is a marked frequency difference from the frequency of the input signal. Moreover, in this waveguide channel type optical frequency comb generator 40, a large number of sidebands of uniform high light intensity may be generated in each band, so that, by applying the waveguide channel type optical frequency comb generator to the light communication apparatus of the wavelength division multiplexing communication system, it is possible to generate a large number of light beams with different wavelengths, to apply modulation using the so generated light beams as a carrier wave to generate light modulated signals, to multiplex the signals and to send out the multiplexed signals.

It should be noted that, according to the present invention, the aforementioned transmittance may be set only to the light incident side reflecting film 404 or only to the light outgoing side reflecting film 405, instead of to each of the light incident side reflecting film 404 and the light outgoing side reflecting film 405.

Moreover, the present waveguide channel type optical frequency comb generator 40 can be reduced in size, as compared to the bulk type optical frequency comb generator 1 employing a bulk crystal, such that it is possible to suppress parasitic capacitance or the parasitic inductance. Thus, in the waveguide channel type optical frequency comb generator 40, the applied voltage may be reduced, so that the device may be improved in operating speed, while it can also be integrated to other ultra-high-speed devices.

The waveguide channel type optical frequency comb generator 40 may be of the structure as now explained.

Figure 24:
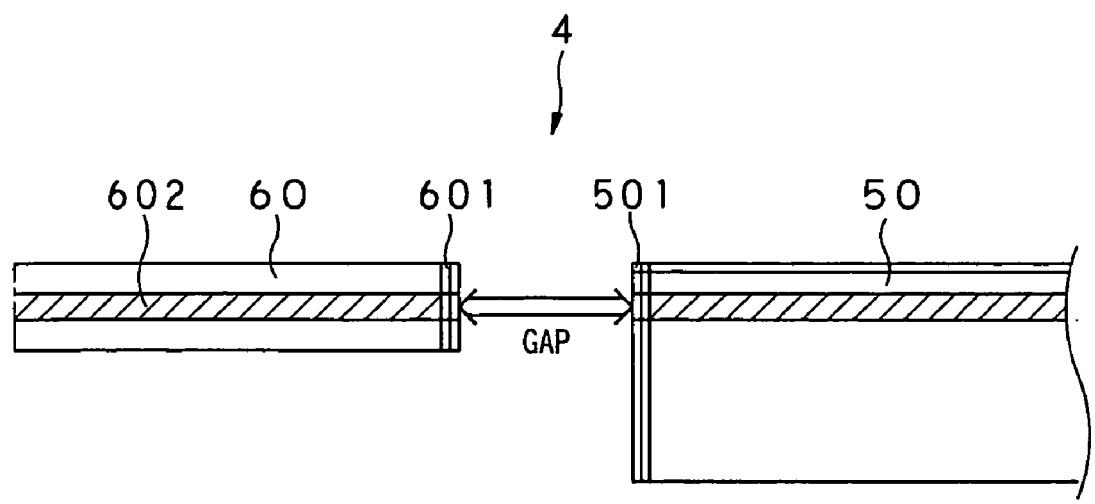
FIG. 24 shows an incident side coupling system of the waveguide channel type optical frequency comb generator to which is incident the Fabry-Perot resonated light.

FIG. 24 shows, in a side view, an incident side coupling system 4 of a waveguide channel type optical frequency comb generator 50 on which is incident the Fabry-Perot resonated light. This incident side coupling system 4 is made up by an optical fiber 60, radiating the light from an optical fiber core 602, and the waveguide channel type optical frequency comb generator 50. In this incident side coupling system 4, the light radiated from the optical fiber core 602 undergoes Fabry-Perot resonation in a space between a light incident side reflecting film 501 in the waveguide channel type optical frequency comb generator 50 and a fiber reflecting film 601 provided to an end face of the optical fiber 60. That is, only the light that has met the condition of resonation as found from the length of a gap between the light incident side reflecting film 501 and the fiber reflecting film 601 and from the light frequency is transmitted through the light incident side reflecting film 501 and introduced by incidence coupling to the waveguide channel 402 with a high efficiency.

Figure 25A:
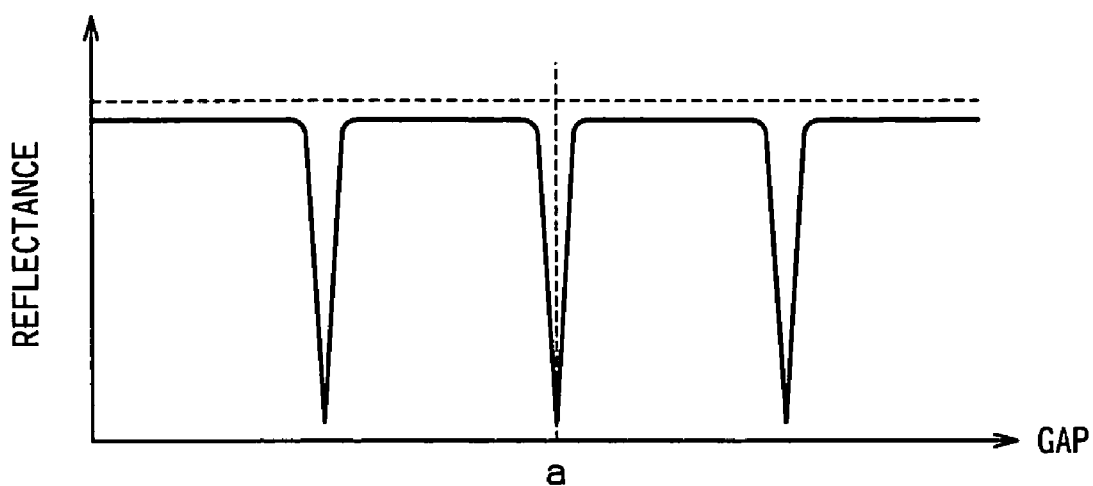
FIGS. 25A and 25B show the relationship of the reflectance and the transmittance on an incident side reflecting film of the incident light with the frequency $v_1$ with respect to a gap between the incident side reflecting film and the fiber reflecting film.
Figure 25B:
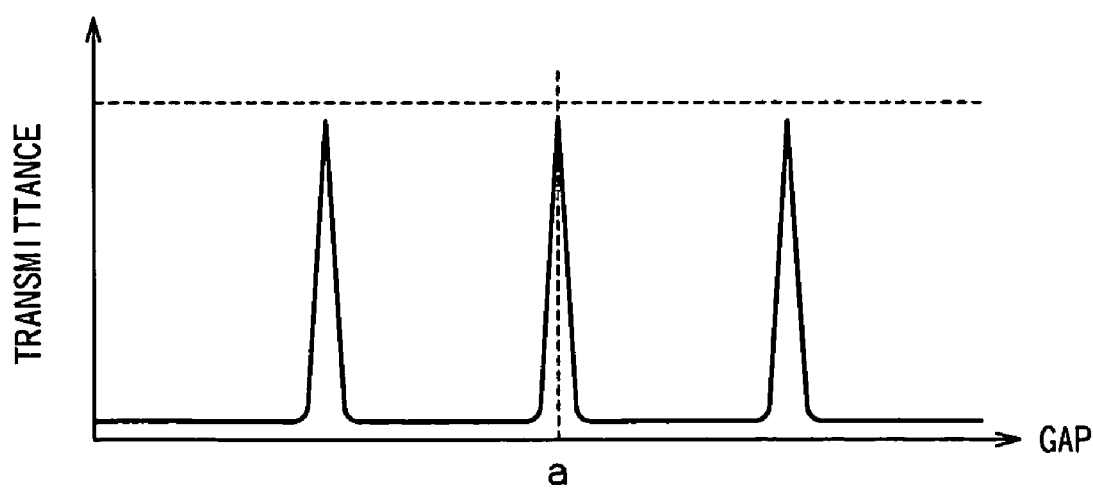

FIGS. 25A and 25B show the relationship between the reflectance and the transmittance of the incident light with the frequency $v_1$ on the light incident side reflecting film 501 with respect to the gap between the light incident side reflecting film 501 and the fiber reflecting film 601. If, by changing this gap, the conditions for resonation at the frequency $v_1$ are met, the reflectance and the transmittance are lowered and raised, respectively. That is, according to the present invention, if the conditions for resonation are met, and the gap is controlled to a length corresponding to the group velocity of light, it becomes possible to cause only the incident light of the frequency $v_1$ to be transmitted efficiently through the light incident side reflecting film 501.

Meanwhile, the gap length is desirably as short as possible, while the optical path length of the gap is desirably controlled to about ten times the wavelength. This applies to a case where e.g. an adhesive is charged into the gap.

Figure 26A:
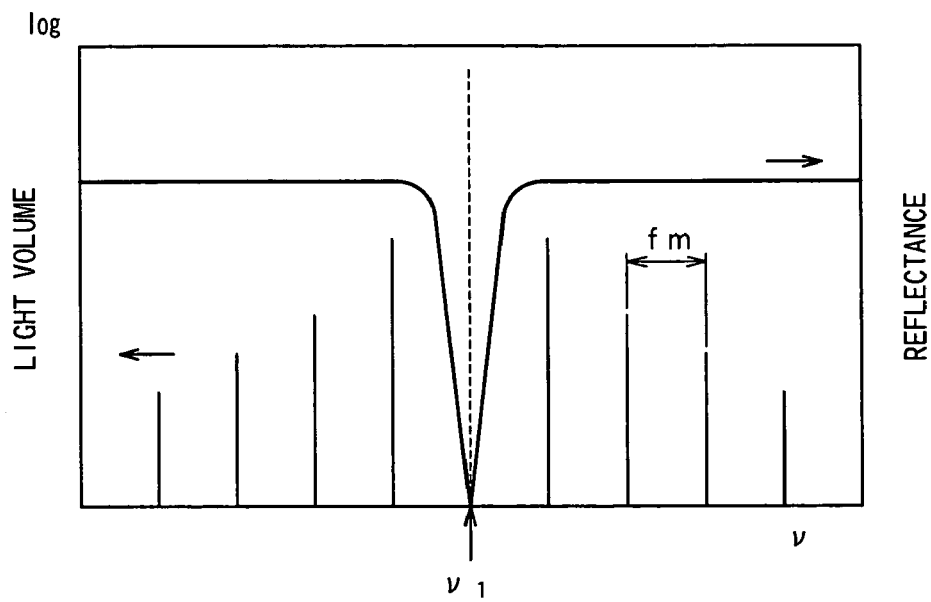
Figure 26B:
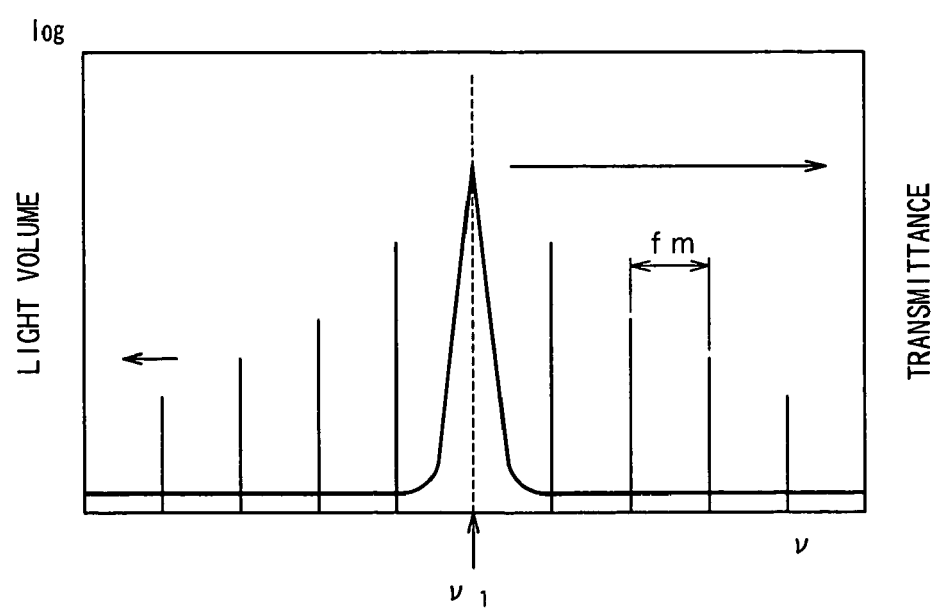

FIGS. 26A, 26B show the relationship between the reflectance and the transmittance for each frequency on the light incident side reflecting film 501 for the length a of the gap between the light incident side reflecting film 501 and the fiber reflecting film 601. For a band other than the frequency $v_1$, the transmittance and the reflectance become lower and higher, respectively, so that walk-off of the generated sidebands to outside can be prevented from occurring. Thus, according to the present invention, the light can efficiently be enclosed within the waveguide channel type optical frequency comb generator 50, thus enabling light losses to be reduced.

Meanwhile, the favorable effect of the present invention may be accomplished not only in case the reflectance in the light incident side reflecting film 501 is set so as to be minimum at the frequency $v_1$ of the incident light, but also in case the reflectance is freely set for the entire frequency range. It should be noted that, when the reflectance limitlessly approaches to 100% for the entire frequency range, the sidebands generated in the bands other than $v_1$ may be reflected most efficiently and confined in the inside of the waveguide channel type optical frequency comb generator 50.

The waveguide channel type optical frequency comb generator 40 according to the present invention may further be applied to a waveguide channel type optical frequency comb generator 60 as now explained.

Figure 27:
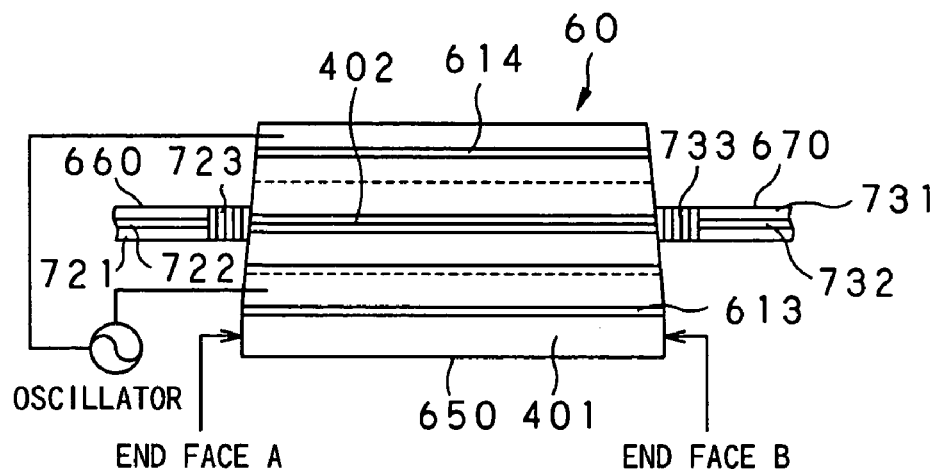
FIG. 27 shows an example of application of a waveguide channel type optical frequency comb generator.

Referring to FIG. 27, the waveguide channel type optical frequency comb generator 60 is made up by a waveguide channel type optical modulator 650, a light incident side optical fiber 660 and a light radiating side optical fiber 670. The parts and components which are the same as those of the waveguide channel type optical frequency comb generator 40 are denoted by the same reference numerals, and the corresponding description is omitted for simplicity.

The waveguide channel type optical modulator 650 includes a substrate 401, a waveguide channel 402, a clad layer 613 and a pair of electrodes 604.

The electrode 614, provided on the clad layer 613, is formed of a metal material, e.g. Al, Cu, Pt or Au, and introduces the electrical signal of the frequency fm, supplied from an oscillator, to the waveguide channel 402, for driving.

An end face of the waveguide channel 402, on which falls the light (referred to below as end face A), and an end face thereof, from which the light is radiated (referred to as an end face B), are processed with e.g. mechanical or chemical polishing, after slicing the waveguide channel type optical resonator from the wafer, for reducing surface roughness, preferably for setting surface roughness to approximately $\lambda/20$ where $\lambda$ is the wavelength in use. Moreover, these end faces A, B are adjusted so as to be perpendicular to the waveguide channel 12, preferably to an error within ±0.1°.

The light incident side optical fiber 660 propagates light through a core 722 formed on the inner side of a clad 721. This light incident side optical fiber 660 radiates light to the waveguide channel 402 through a dielectric multi-layer film 723 formed on an end face. The surface of the dielectric multi-layer film 723 is polished to such an extent that scattering is not produced when the film 23 is abutted against the end face A, that is, surface roughness of the film is diminished to approximately $\lambda/20$ where $\lambda$ is the wavelength in use.

On the light radiating side optical fiber 670, light is incident from the waveguide channel 402 through a dielectric multi-layer film 733 formed on a fiber end face. The light radiating side optical fiber 670 propagates the light incident from the waveguide channel 402 through a core 732 formed on the inner surface of a clad 731. The surface of the dielectric multi-layer film 733 is polished to substantially the same extent as the dielectric multi-layer film 723.

Figure 28:
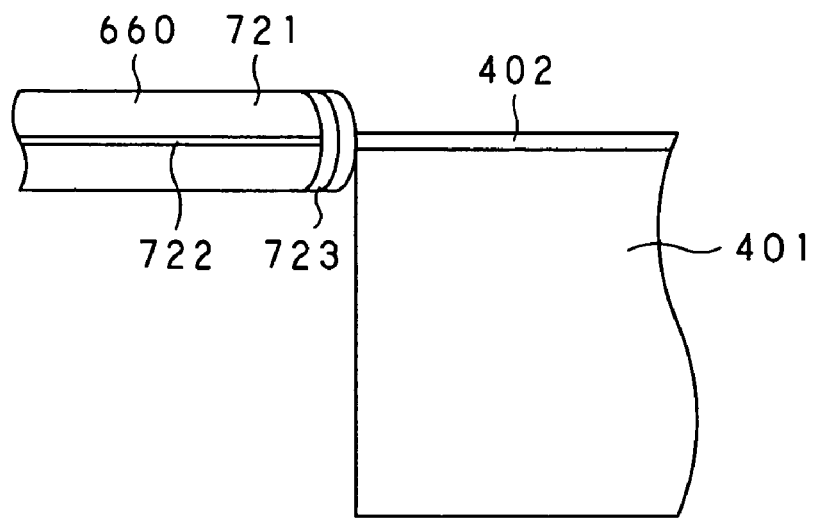
FIG. 28 shows the surface of a multi-layer dielectric film polished to a convex shape.

Turning to the light incident side optical fiber 660 and the light radiating side optical fiber 670, the fiber ends may be polished to a convex shape, and finally the dielectric multi-layer films 723, 733 may then be coated, as are the incident side ends shown in FIG. 28. This facilitates abutment against the end faces A, B of the light incident side optical fiber 660 and the light radiating side optical fiber 670. According to the present invention, this convex surface may be provided on the waveguide channel.

Meanwhile, light incident side optical fiber 660 and the light radiating side optical fiber 670 are secured so that the surfaces of the dielectric multi-layer films 723, 733 are completely abutted against the end faces A and B. That is, the optical coupling system between the optical fibers 660, 670 and the waveguide channel 402 causes light to be incident or radiated directly without the intermediary of a non-spherical lens.

The thickness of each layer forming the dielectric multi-layer films 723, 733 is approximately $\lambda/4$ where $\lambda$ is the wavelength in use. These layers are formed by vapor depositing thin films of different refractive indices in alternation with each other. The dielectric multi-layer films 723, 733 may be controlled to a desired transmittance by alternately layering materials of different refractive indices in dependence upon the wavelength of the reflected light. Meanwhile, according to the present invention, the transmittance of the dielectric multi-layer film 723 is similar to that of the incident side reflecting mirror 112. That is, the transmittance of the dielectric multi-layer film 723 is set so as to be maximum at the frequency $v_1$ of the incident light. The transmittance of the dielectric multi-layer film 733 is similar to that of the outgoing side reflecting mirror 113. That is, the transmittance of the dielectric multi-layer film 733 is set from one frequency to another, depending on the light intensity of the generated sidebands.

The shape of the distal ends of the light incident side optical fiber 660 and the light radiating side optical fiber 670 is now explained.

Figure 29:
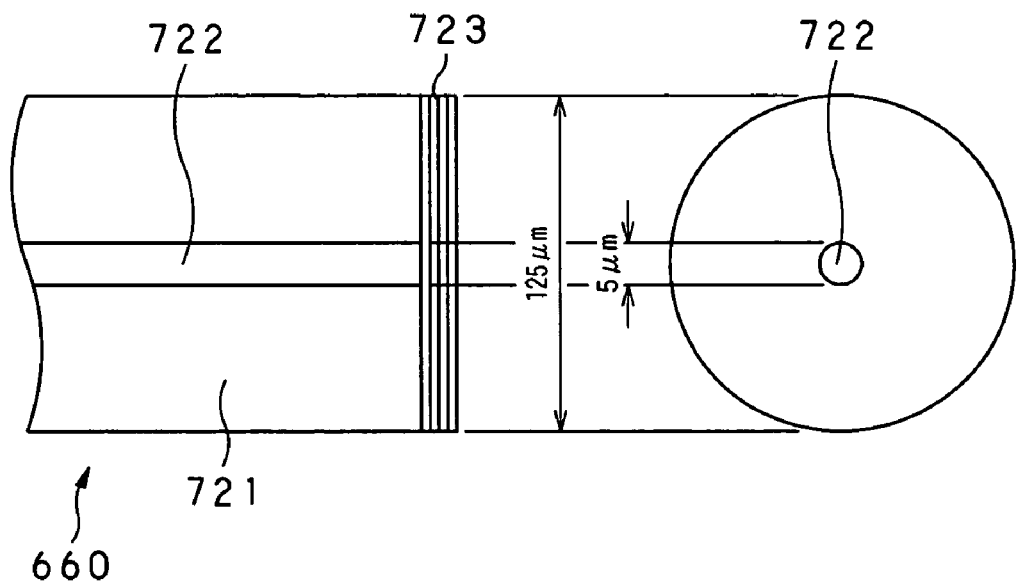
FIG. 29 illustrates the shape of the distal end of the incident side optical fiber where a multi-layer dielectric film is formed.

FIG. 29 shows the shape of the distal end of the light incident side optical fiber 660 provided with the dielectric multi-layer film 723. In the instance shown in FIG. 29, the diameter of the clad 721 is 125 µm, while the diameter of the core 722 is approximately 3 to 5 µm. The beam diameter of the light beam propagated with the core 722 as center is approximately 10 µm.

Figure 30:
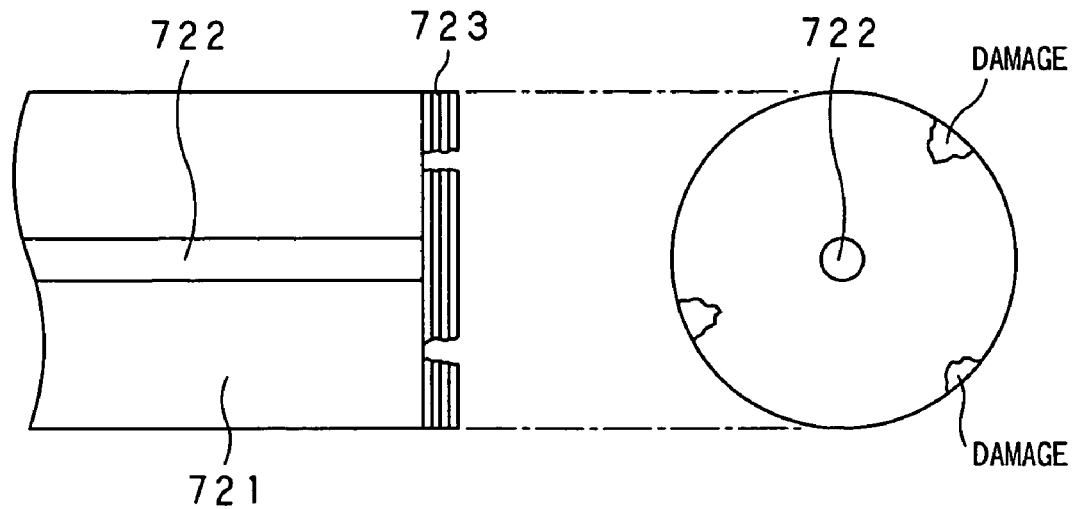
FIG. 30 illustrates a case where scars or damages are produced at a corner portion of the multi-layer dielectric film.

That is, since the core 722 and the vicinity in the dielectric multi-layer film 723 is wrapped in a thick clad 721 and hence is insusceptible to damages from outside. In particular, scars or damages or distortion due to the inner stress are liable to be produced in the corner portions of the dielectric multi-layer film 723, as shown in FIG. 30. However, even if the corner parts of the dielectric multi-layer film 723, which cover up the core layer by the thick clad 721, are subjected to peel-off of tens of µm, the core and the vicinity thereof substantially remain unaffected.

Thus, according to the present invention, the dielectric multi-layer films 723, 733, substantially insusceptible to damages, are abutted against the optical fibers from both ends of the waveguide channel 402 in the vicinity of the core 722, whereby the light leakage from the waveguide channel 402 scarcely occurs. Thus, the light loss may be diminished and finesse of the waveguide channel type optical frequency comb generator 60 may be improved.

That is, with the waveguide channel type optical frequency comb generator 60 according to the present invention, the light propagated through the inside of the waveguide channel 402 is resonated by the dielectric multi-layer film 723 of the light incident side optical fiber 660 and the dielectric multi-layer film 733 formed at the distal end of the light radiating side optical fiber 670, arranged on either sides of the waveguide channel 402. Thus, with the waveguide channel type optical frequency comb generator 60 according to the present invention, the light may be reflected back and forth by the dielectric multi-layer films 723, 733, substantially insusceptible to damages, so that finesse may be improved without light leakage. Moreover, with the waveguide channel type optical frequency comb generator 60, in which the transmittance of the dielectric multi-layer films 723, 733 is set as described above, the light loss may be suppressed to a minimum as it is attempted to flatten out the light intensity distribution in the generated sidebands.

The waveguide channel type optical frequency comb generator 40 of the present invention may further be applied to the waveguide channel type optical frequency comb generator 80 as now explained.

Figure 31:
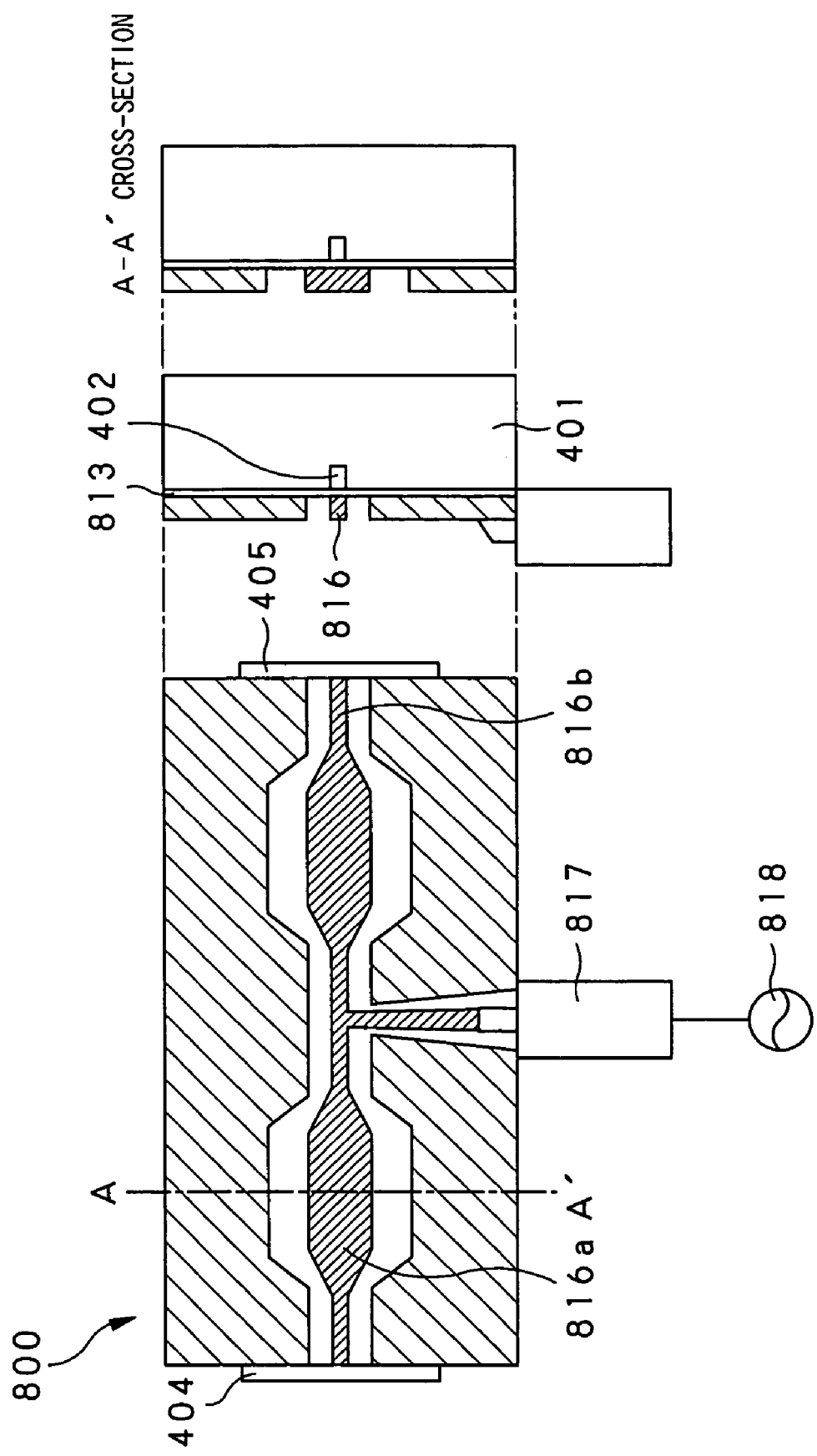
FIG. 31 shows the structure of an optical frequency comb generator including a broad-with area and a narrow-width area.

This waveguide channel type optical frequency comb generator 80 comprises a waveguide channel type optical modulator 800, as shown in FIG. 31. This waveguide channel type optical modulator 800 includes a substrate 401, a waveguide channel 402, a buffer layer 813, an incident side reflecting film 404, a light radiating side reflecting film 405, a pair of electrodes 816, a power feed unit 817 and an oscillator 818. The parts or components which are the same as those of the waveguide channel type optical frequency comb generator 40 are depicted by the same reference numerals, and are not explained specifically.

The electrode 816 is mounted on top of the buffer layer for applying phase modulation to the light propagated on the waveguide channel 402, and is made up by a micro-strip line structure, such as a coplanar strip. According to the present invention, the micro-strip, oscillated from an oscillator 818, is fed to the electrodes 816, made up by this micro-strip line, via a feeder 817 formed by e.g. a coaxial cable, whereby an electrical field consistent with the voltage and the electrode width is generated in a lower portion of the electrode 816. The so generated electric field varies the refractive index of the waveguide channel 402, thus allowing phase modulation of light resonated within the waveguide channel 402.

Since the higher modulation efficiency may be obtained by exploiting the crystal forming the waveguide channel 402, the electrode 816 is extended parallel to and so as to be coincident in length with the length of the waveguide channel 402. Referring to FIG. 31, the electrode 816 has a broad-width area 816a and a narrow-width area 816b, as shown in FIG. 31. Meanwhile, the broad-width area is broader in width than the waveguide channel, when seen in a cross-section taken along line A-A', and is of a width of approximately 100 µm in width. The narrow-width area 816b is set to a length approximately equal to the width of the waveguide channel and is approximately 10 µm in width.

Thus, according to the present invention, the broad-width area 816a and a narrow-width area 816b are provided alternately to vary the electrical resistance of the electrode 816 itself on the area basis. If, in particular, the electrode width of the broad-width area 816a is ten times that of the narrow-width area 816b, the electrical resistance may be reduced to one-tenth.

The loss of the micro-wave propagated within the electrode 816 made up by the broad-width area 816a and the narrow-width area 816b is now explained. FIG. 32 shows the loss of the micro-wave propagated within the electrode 816.

It is assumed that, in FIG. 32, the effect of power feed by the feeder 817 is negligible as compared to the voltage distribution, current distribution, electrical field distribution and resistance loss distribution in the electrode. It is also assumed that both ends of the electrode 816 are opened, and that the state of resonation is set when the relationship of $2N=N\lambda$ is met for the electrode 816 with the length L, where $\lambda$ is the wavelength of the micro-wave propagated within the electrode 816. Moreover, it is assumed that, for carrying out calculations for an assumed case of the high modulation efficiency, the velocity of the micro-wave propagated within the electrode 816 is equal to the velocity of light propagated within the waveguide channel 402. In addition, the electrode-to-electrode distance is adjusted so that the characteristic impedance and the velocity of the micro-wave of the electrode 816 in its entirety will be equivalent to those of the conventional waveguide channel type optical modulator made up only of the narrow-width area, that is, so that the micro-wave will be in the resonating state.

Figure 32A:
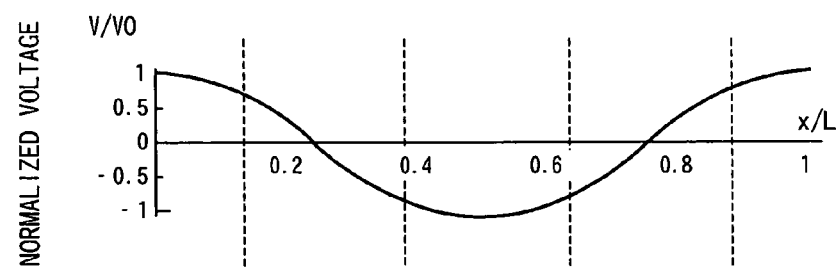
FIGS. 32A to 32D show the losses of the micro-wave propagated in the electrode of an optical frequency comb generator including a broad-width area and a narrow-width area.

It is now assumed that the distance from the incident side reflecting film of light is x, and that, for taking account of a case where the wavelength $\lambda$ of the micro-wave is equal to the length L of the electrode 816. It is noted that, if the maximum voltage is $V_0$, the distribution of the voltage V shown in FIG. 32A is such that $V=V_0 \cos(2\pi x/L)\sin(\omega t)$, where the component of $\sin(\omega t)$ representing time changes is unity. Since it is assumed that the characteristic impedance of the electrode 816 in its entirety and the micro-wave velocity are the same as those of the electrode formed only of the narrow-width area, the voltage distribution shows the tendency similar to that of the conventional waveguide channel type optical modulator.

Figure 32B:
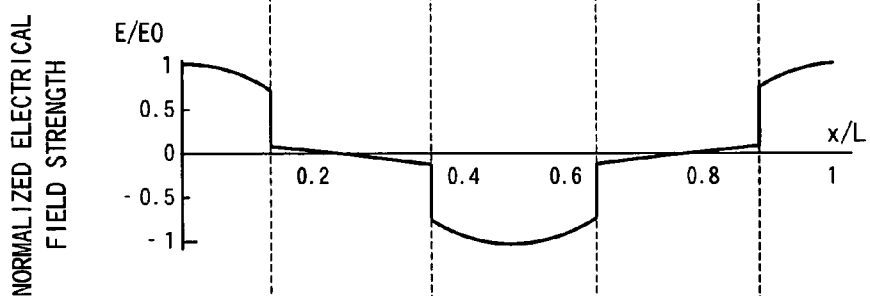
Figure 32C:
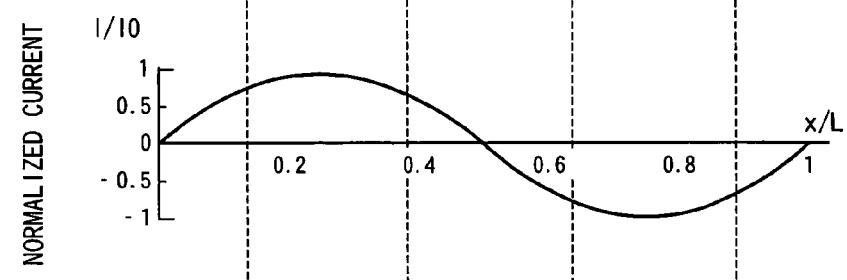

The distribution of the current I in the electrode 816 is represented by $I=I_0 \cos(2\pi x/L)\sin(\omega t+\phi)$, as shown in FIG. 32C. In this equation, $I_0$ is a factor determined by the characteristic impedance Z in the electrode 816 and is represented by $I_0=V_0/Z$ and $\phi$ is the current-voltage phase difference. The current distribution shown in FIG. 32C depends on the voltage tendency, so that the tendency is similar to that in the conventional waveguide channel type optical modulator. Meanwhile, since the voltage distribution and the current distribution shown in FIG. 32 have been calculated with the state of resonation as premises, the voltage V and the current I are distributed in actuality in the polarity inverted state.

In the area in the vicinity of x=L/4 and 3L/4 where the current is maximum, the applied voltage is low. Thus, if the current loss is lowered at the sacrifice of the modulation of this area, in other words, if the modulation efficiency in the area is lowered, it is possible to reduce the effect on the overall modulation efficiency. Thus, according to the present invention, the area in the vicinity of x=L/4 and 3L/4 is the broad-width area. Since the resistance to the current may be diminished in this manner, the micro-wave loss may be diminished.

Figure 32D:
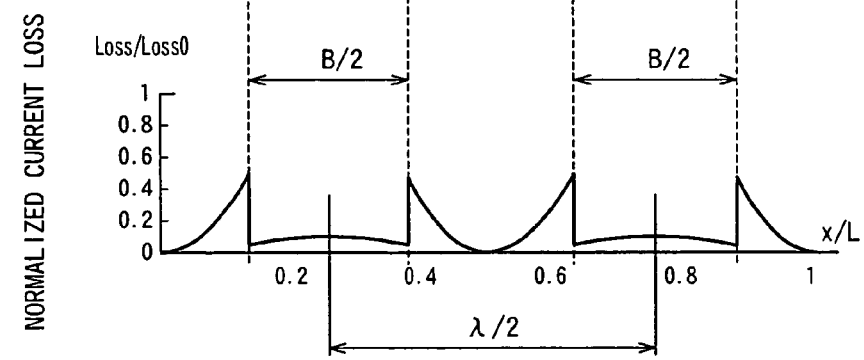

The resistance loss Ls on the electrode 816 is proportional to the square of the current and is represented by $Ls=Ls_0 \cos(2\pi x/L)^2$. It is noted that $Ls_0=RI^2/2$, such that, if R is the electrical resistance per unit length of the electrode 816, the micro-wave loss of the broad-width area 816a having an electrode width ten times that of the narrow-width area 816b may be represented as shown in FIG. 32D. By providing the broad-width area 816a for decreasing the resistance to current, the micro-wave loss (Loss/Loss0) may appreciably be decreased for a period coincident with the half-wavelength $\lambda/2$ of the micro-wave, as shown in FIG. 32D.

Moreover, by setting a large width of the electrode 816, the number of electrical lines of force per unit area is decreased, so that the electrical field is decreased in the broad-width area 816a, as shown in FIG. 32B. On the other hand, the electrical field generated via the electrode 816 by the micro-wave is decreased, as a result of which the modulation efficiency is lowered.

Figure 33:
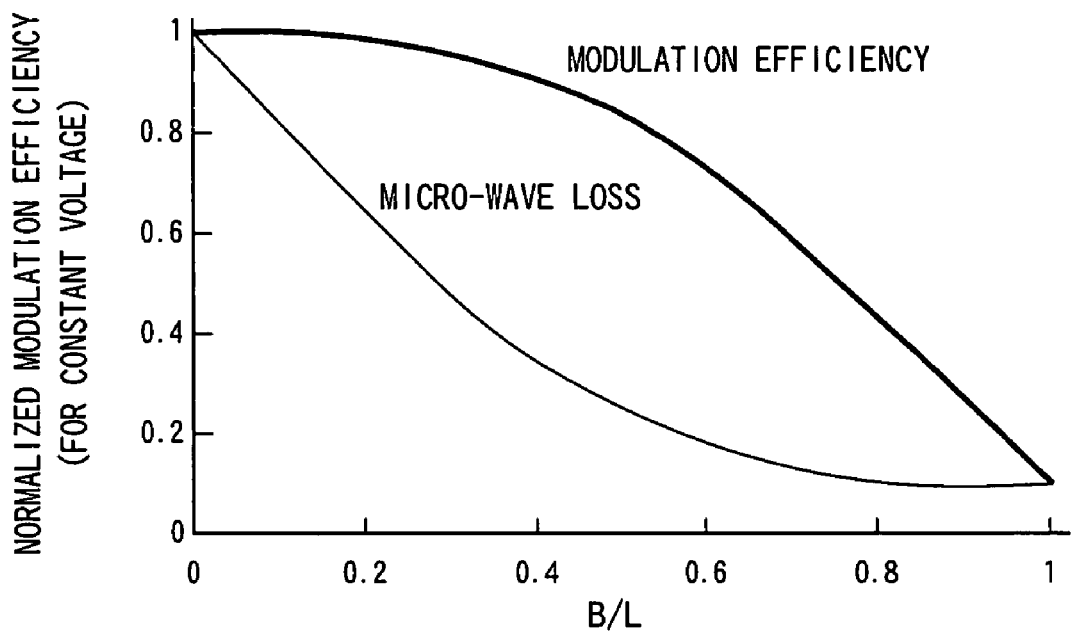
FIG. 33 shows changes in the microwave losses and the modulation efficiency on the electrode of an optical frequency comb generator including a broad-width area and a narrow-width area.

FIG. 33 shows the calculated results of the micro-wave loss and the modulation efficiency on the electrode 816 for the assumed case of a constant voltage applied to the electrode 816. In this figure, the abscissa B/L shows the ratio of the length B of the broad-width area 816a to the length L of the resistance 816 in its entirety. As the ratio of the broad-width area 816a, the micro-wave loss caused by the lowered electrical resistance is decreased. Additionally, since the strength of the electrical resistance is also locally decreased, as shown in FIG. 32B, the modulation efficiency is also decreased. However, the degree of the decrease in the modulation efficiency is more moderate than the degree of the decrease in the micro-wave loss. This suggests that, by providing the broad-width area 816a, the micro-wave loss may be decreased as the degree of the decrease in the modulation efficiency is suppressed to a lower value.

Figure 34:
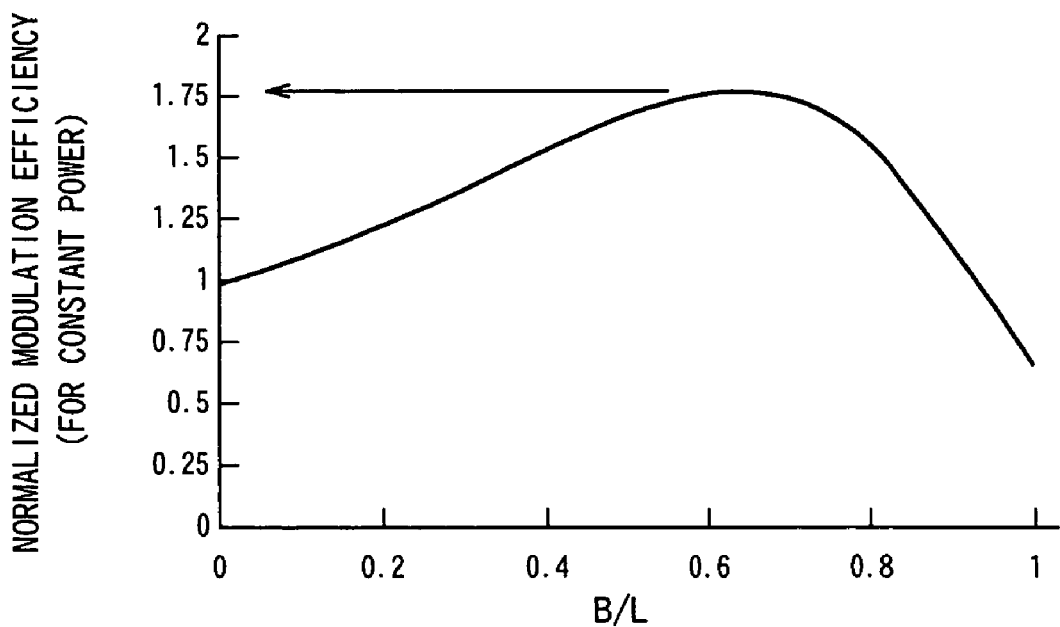
FIG. 34 shows the modulation efficiency in the optical frequency comb generator including a broad-width area and a narrow-width area, with the power being constant.

FIG. 34 shows the results of calculations of the modulation efficiency in case the characteristic impedance of the electrode 816 in its entirety is assumed to be controlled so that the supplied power is consumed in its entirety within the waveguide channel type optical modulator 800, and in case the micro-wave loss is assumed to be caused by the resistance of the electrode 816 for simplicity. From this figure, showing the modulation efficiency for the case of the constant power, it may be seen that the modulation efficiency takes on the maximum value of 1.8 for the value approximately 0.65 of B/L. This suggests that, in case of normalization with the voltage, the modulation efficiency is lowered, however, in case of normalization with the power supplied to the waveguide channel type optical modulator 1 in its entirety, the modulation efficiency increases. Of course, the maximum value of the modulation efficiency may further be improved by adjusting the widths of the broad-width area 816a and the narrow-width area 816b.

With the waveguide channel type optical modulator 800, according to the present invention, in which the modulating electrical field can be applied through the electrode 816 including the broad-width area 816a having the reduced resistance to the current, the micro-wave loss may be diminished. Moreover, by controlling the positions of the broad-width area 816a and the narrow-width area 816b in dependence upon the micro-wave wavelength, it becomes possible to decrease the micro-wave loss and to prevent the modulation efficiency from being lowered. Additionally, normalization with power leads to further improvement of the modulation efficiency. Even if the wavelength $\lambda$ is not equal to the electrode length L, the micro-wave loss may be suppressed by providing plural broad-width areas 816a with a period which is in keeping with the half-wavelength $\lambda/2$.

That is, with the waveguide channel type optical modulator 800, according to the present invention, the micro-wave loss may be decreased to assure a high modulation efficiency, by employing a routine metal electrode of, for example, Au, instead of employing a superconducting material as an electrode material. If the high modulation efficiency is desired through use of an elongated area of a crystal forming the waveguide channel 402, the micro-wave loss may be decreased by providing the broad-width area 816a without providing plural feed units 817. Thus, with the waveguide channel type optical modulator 800, according to the present invention, the problem of complex circuit structures may be resolved.

Moreover, with the present waveguide channel type optical modulator 800, the aforementioned transmittance is set for each of the light incident side reflecting film 404 and the light outgoing side reflecting film 405. Thus, with the waveguide channel type optical frequency comb generator 80, formed by the waveguide channel type optical modulator 800, the light loss may be suppressed to the smallest value possible as attempts are made to flatten out the light density distribution in the generated sidebands.

The present invention is not limited to the above-described embodiment. The electrode width of the broad-width area 816a may be any desired number times, instead of ten times, the electrode width of the narrow-width area 816b. The shape of the broad-width area 816a is not limited to that described above and may, for example, be of a tapered shape. The favorable result as described above may also be realized by controlling the shape of the narrow-width area 816b instead of controlling the shape of the broad-width area 816a.

The electrode structure according to the present invention may be applied to the optical phase modulator or to the light intensity modulator. Although the micro-wave loss is suppressed by providing the broad-width area 816a and the narrow-width area 816b having different widths of the electrode 816, the same favorable result may be achieved by changing not the width but the thickness of the electrode 816.

Of course, the structure of the electrode 816 shown in FIG. 35 may be used in the present waveguide channel type optical modulator 800. It is noted that the feeder 817 is omitted from the drawing of FIG. 35.

Figure 35A:
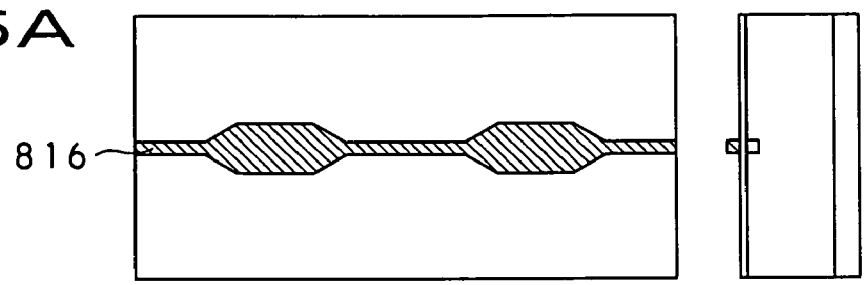
FIGS. 35A to 35D show the exemplary shape of an electrode in the optical frequency comb generator including a broad-width area and a narrow-width area.
Figure 35B:
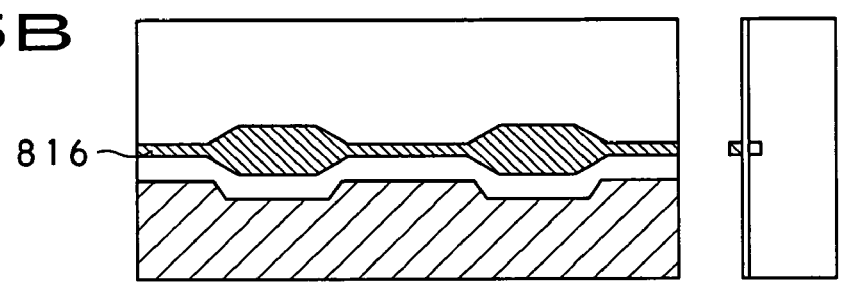
Figure 35C:
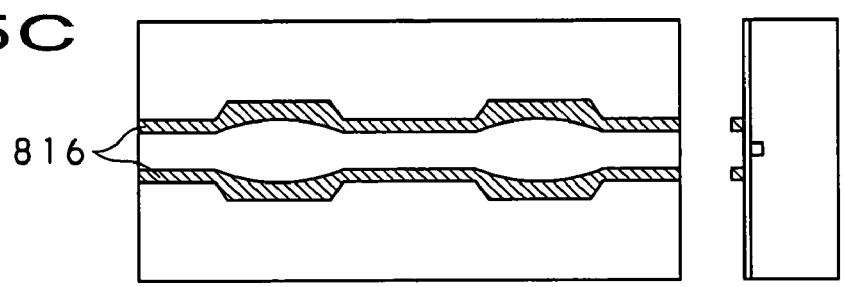
Figure 35D:
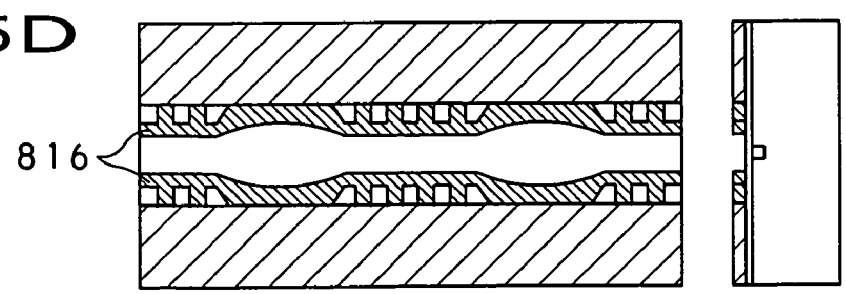

In FIG. 35A, the ground provided around the electrode 816 may be provided to the bottom of the substrate 401. In an embodiment shown in FIG. 35B, a dual-electrode coplanar line is used. In an embodiment shown in FIG. 35C, a coplanar strip line is used and, in an embodiment shown in FIG. 35D, a meshed slot line is used as an electrode 816. In the meshed slot line, the capacitance may be decreased as a narrow electrode-to-electrode distance is kept, however, the resistance of the meshed portion is increased. Thus, in the high-current region, the meshed portion is dispensed with and, instead, the electrode-to-electrode distance is increased.

The invention claimed is:

1. An optical frequency comb generator comprising oscillation means for oscillating modulating signals of a preset frequency, resonation means formed by an incident side reflecting mirror and an outgoing side reflecting mirror, arranged parallel to each other, said resonation means causing resonation in light incident via said incident side reflecting mirror, and optical modulation means arranged between said incident side reflecting mirror and said outgoing side reflecting mirror for phase modulating the light resonated in said resonation means by said modulating signals supplied from said oscillation means, and for generating a plurality of sidebands centered about a frequency of the incident light at a frequency interval of said modulating signal;
a transmittance of said outgoing side reflecting mirror configured to be set from one frequency to another responsive to a light intensity of the generated sidebands.

2. An optical frequency comb generator comprising oscillation means for oscillating modulating signals of a preset frequency, resonation means formed by an incident side reflecting mirror and an outgoing side reflecting mirror, arranged parallel to each other, said resonation means causing resonation in light incident via said incident side reflecting mirror, and optical modulation means arranged between said incident side reflecting mirror and said outgoing side reflecting mirror for phase modulating the light resonated by said resonation means by said modulating signals supplied from said oscillation means, and for generating a plurality of sidebands centered about a frequency of the incident light at a frequency interval of said modulating signal;
said incident side reflecting mirror having a maximum transmittance at the frequency of the incident light.

3. The optical frequency comb generator according to claim 2 further comprising a filter on which said generated sidebands are incident via said outgoing side reflecting mirror;
said filter having a smallest transmittance at the frequency of the incident light.

4. An optical frequency comb generator comprising, oscillation means for oscillating modulating signals of a preset frequency, resonation means formed by an incident side reflecting mirror and an outgoing side reflecting mirror, arranged parallel to each other, said resonation means causing resonation in light incident via said incident side reflecting mirror, and optical modulation means arranged between said incident side reflecting mirror and said outgoing side reflecting mirror for phase modulating the light resonated by said resonation means by said modulating signals supplied from said oscillation means, and for generating a plurality of sidebands centered about a frequency of the incident light at a frequency interval of said modulating signal; wherein
said incident side reflecting mirror having a maximum transmittance at the frequency of the incident light and,
the transmittance of said outgoing side reflecting mirror configured to be set from one frequency to another responsive to a light intensity of the generated sidebands.

5. The optical frequency comb generator according to claim 4 wherein the transmittance for said outgoing side reflecting mirror is set from one frequency to another based on a rate of change of the light intensity of the generated sidebands with respect to the frequency.

6. The optical frequency comb generator according to claim 4, wherein said optical modulation means is a bulk crystal with a refractive index that changes on application of an electrical field.

7. The optical frequency comb generator according to claim 6 wherein said incident side reflecting mirror is a high reflecting film formed on the light incident side of said optical modulation means and wherein said outgoing side reflecting mirror is a movable mirror carrying a high reflecting film and arranged on a light radiating side of said optical modulation means for movement by electro-mechanical transducer means.

8. The optical frequency comb generator according to claim 6 further comprising
a cavity modulating signal resonator having said optical modulation means enclosed therein;
a cavity of said cavity modulating signal resonator resonated with said modulating signals being U-shaped;
the length of said cavity ahead and in rear of said optical modulator being set to one-fourth the wavelength of the resonation frequency.

9. The optical frequency comb generator according to claim 6 further comprising
a cavity modulating signal resonator having said optical modulation means enclosed therein;
a cavity of said cavity modulating signal resonator resonated with said modulating signals being of a closed loop shape.

10. The optical frequency comb generator according to claim 4 wherein said optical modulation means is a waveguide channel propagating the light.

11. The optical frequency comb generator according to claim 10 wherein said incident side reflecting mirror and the outgoing side reflecting mirror are reflecting films formed on an incident side end face and/or an outgoing side end face of said optical modulation means.

12. The optical frequency comb generator according to claim 10 wherein said incident side reflecting mirror is a reflecting mirror formed on an end face of an incident side optical fiber for transmitting light to said resonation means and wherein the outgoing side reflecting mirror is a reflecting film formed on an end face of an outgoing side optical fiber for receiving the sidebands generated by said optical modulation means.

13. The optical frequency comb generator according to claim 12 wherein the end face of said incident side optical fiber and/or the end face of said outgoing side optical fiber come into contact with end faces of said waveguide channel.

14. The optical frequency comb generator according to claim 12 wherein said reflecting films are dielectric multilayer films having a plurality of materials of different refractive indices layered together.

15. The optical frequency comb generator according to claim 10 wherein said incident light is radiated from an optical fiber carrying a reflecting film on an end face thereof and resonated between said reflecting film and another reflecting film arranged on the incident side end face of said optical fiber.

16. The optical frequency comb generator according to claim 10 further comprising an electrode arranged parallel to said optical modulating means and including at least two broad-width areas and a narrow-width area, said electrode applying an electrical field to said optical modulation means based on modulating signals oscillated by said oscillation means;
said electrode including said broad-width areas spaced at a period corresponding to one half wavelength of said modulating signal oscillated by said oscillation means.

17. The optical frequency comb generator according to claim 16 wherein said optical modulation means modulates the phase of the light resonated by said resonation means based on the wavelength of said modulating signal.

18. The optical frequency comb generator according to claim 1, wherein the transmittance of said outgoing side reflecting mirror set from one frequency to another is configured to control intensity of light transmitted and flatten spectral components of the light transmitted.

19. The optical frequency comb generator according to claim 1, further comprising an initial value control device configured to provide an initial value comprising a transmittance for change in frequency, causing a transmitted light intensity distribution to be flattened out over a partial frequency range controlled by the initial value.

20. The optical frequency comb generator according to claim 1, wherein a light intensity $P_{out}$ of light transmitted through said outgoing side reflecting mirror comprises a value approximated, without consideration of incidental losses, by, $$P_{out}=T_{in}T_{out}\exp\{--|\Delta f|Los/(\beta fm)\}P_{in}$$

where $T_{in}$ is transmittance of said outgoing side reflecting mirror, $T_{out}$ is transmittance of the incident side reflecting mirror, $\beta$ is a modulation factor during reciprocation of light within the resonation means, Los is a loss rate of light during reciprocation within the resonation means, and $P_{in}$ is an intensity of the incident light.

21. An optical frequency comb generator, comprising:
a wafer crystal substrate;
a waveguide channel formed over the wafer crystal substrate having an index of refraction greater than an index of refraction of the wafer crystal substrate;
an incident transmittance layer disposed on an incident end of the waveguide channel;
an outgoing transmittance layer disposed on an outgoing end of the waveguide channel;
an electrode placed substantially over and parallel to the waveguide channel;
a generator coupled to the electrode and configured to energize the electrode with a modulating electrical field;
wherein:
the incident transmittance layer is configured to allow light incident to the incident transmittance layer to enter the waveguide and reflect light traveling the waveguide;
the outgoing transmittance layer is configured to reflect light in the waveguide and transmit light from the waveguide at a predetermined proportion such that the amount of light transmitted at each frequency of light in the waveguide is different and based on an intensity of the light frequency.

22. The optical frequency comb generator according to claim 21, wherein the outgoing transmittance layer is configured to only reflect or transmit light.

23. The optical frequency comb generator according to claim 21, wherein a direction of light propagation through the waveguide channel and a direction of modulating current applied to the metal electrode are coincident.

24. The optical frequency comb generator according to claim 21, wherein the electrical field is synchronized with a time of roundtrip travel of light through the waveguide.

25. The optical frequency comb generator according to claim 21, wherein the light transmitted by the outgoing transmittance layer comprises incident light frequencies and all sidebands generated by the comb generator in a proportion comprising substantially equal intensities of all light frequencies through an output band of the generator.

26. The optical frequency comb generator according to claim 21, wherein:
said incident transmittance layer is a film on a substantially planar incident surface of the waveguide;
said outgoing transmittance layer is a film on a substantially planar outgoing surface of the waveguide; and
said incident surface and outgoing surface are parallel.

27. The optical frequency comb generator according to claim 21, wherein a loss factor of light in the optical frequency comb generator is only transmission to outside through the incident transmittance layer and the outgoing transmittance layer.

28. The optical frequency comb generator according to claim 16 wherein said broad-width areas and narrow-width area are provided to alternately to vary the electrical resistance of the electrode and correspondingly vary modulation in the resonating means.

* * * * *